United States Patent
Ueda et al.

(10) Patent No.: US 12,078,762 B2
(45) Date of Patent: Sep. 3, 2024

(54) ULTRASONIC SENSOR AND VIBRATION ABSORBER

(71) Applicant: DENSO CORPORATION, Kariya (JP)

(72) Inventors: Keisuke Ueda, Kariya (JP); Taketo Harada, Kariya (JP)

(73) Assignee: DENSO CORPORATION, Kariya (JP)

( * ) Notice: Subject to any disclaimer, the term of this patent is extended or adjusted under 35 U.S.C. 154(b) by 30 days.

(21) Appl. No.: 18/047,999

(22) Filed: Oct. 19, 2022

(65) Prior Publication Data

US 2023/0105548 A1 Apr. 6, 2023

Related U.S. Application Data

(63) Continuation of application No. PCT/JP2021/011963, filed on Mar. 23, 2021.

(30) Foreign Application Priority Data

Apr. 21, 2020 (JP) .................................. 2020-075595

(51) Int. Cl.
*G01S 7/521* (2006.01)
*G01S 15/931* (2020.01)

(52) U.S. Cl.
CPC ............ *G01S 7/521* (2013.01); *G01S 15/931* (2013.01); *G01S 2015/937* (2013.01)

(58) Field of Classification Search
CPC .. G01S 7/251; G01S 15/931; G01S 2015/937; G01S 2015/938; H04R 1/02
See application file for complete search history.

(56) References Cited

U.S. PATENT DOCUMENTS

| | | | | |
|---|---|---|---|---|
| 7,522,474 B2 * | 4/2009 | Nakajima | ............... | G01S 7/521 367/188 |
| 7,583,563 B2 * | 9/2009 | Nakajima | .............. | G10K 9/122 367/188 |
| 9,846,225 B2 * | 12/2017 | Wehling | ................. | H10N 30/03 |
| 11,474,239 B2 * | 10/2022 | Ueda | ...................... | G01S 15/931 |
| 11,667,247 B2 * | 6/2023 | Kamiya | .................. | B60R 11/00 367/140 |
| 2003/0121331 A1 * | 7/2003 | Mitsuoka | ............... | G10K 9/122 73/632 |

(Continued)

FOREIGN PATENT DOCUMENTS

JP  2015-200579 A  11/2015

*Primary Examiner* — John A Tweel, Jr.
(74) *Attorney, Agent, or Firm* — MASCHOFF BRENNAN

(57) ABSTRACT

A vibration absorber includes a large diameter portion and a small diameter portion, being provided to be supported between an ultrasonic microphone and a sensor mounting device. The small diameter portion is formed such that an outer diameter thereof is smaller than that of the large diameter portion, and is provided adjacent to the large diameter portion in a circumferential direction. A pair of large diameter portions are disposed to face each other across a center axis line. A pair of small diameter portions are disposed to face each other across the center axis line. The vibration absorber is configured such that a direction where the pair of large diameter portions positioned across the center axis line are arranged and a direction where the pair of small diameter portions positioned across the center axis line are arranged, cross each other at a right angle.

13 Claims, 18 Drawing Sheets

(56) References Cited

U.S. PATENT DOCUMENTS

2006/0032286 A1* 2/2006 Magane .................. G01H 5/00
                                                73/1.82
2019/0391263 A1   12/2019 Ueda et al.
2023/0057481 A1*  2/2023 Harada ................... B60R 19/48
2023/0070901 A1*  3/2023 Ueda ....................... G01S 7/521

* cited by examiner

ULTRASONIC SENSOR AND VIBRATION ABSORBER

CROSS-REFERENCE TO RELATED APPLICATIONS

This application is the U.S. bypass application of International Application No. PCT/JP2021/11963 filed on Mar. 23, 2021, which designated the U.S. and claims priority to Japanese Patent Application No. 2020-75595 filed on Apr. 21, 2020, the contents of both of these are incorporated herein by reference.

BACKGROUND

Technical Field

The present disclosure relates to an ultrasonic sensor and a vibration absorber provided in the ultrasonic sensor.

Description of the Related Art

As a conventional art, for example, an ultrasonic sensor is attached to a vehicle and used as a rear sonar or a corner sonar. Specifically, a sensor body integrated with a bezel and a vibration retaining member is inserted into a hole of the bumper from outside thereof.

SUMMARY

According to a first aspect of the present disclosure, the vibration absorber includes a large diameter portion provided to be supported between the ultrasonic microphone and the sensor mounting device while contacting with the ultrasonic microphone and the sensor mounting device; and a small diameter portion provided adjacent to the large diameter portion in a circumferential direction that surrounds the center axis line, and formed such that an outer diameter with respect to the center axis line as a center is smaller than that of the large diameter portion.

DETAILED DESCRIPTION OF THE PREFERRED EMBODIMENTS

As a conventional art, for example, Japanese Patent Application Laid-Open Publication No. 2018-146564 discloses an ultrasonic sensor attached to a vehicle and used as a rear sonar or a corner sonar. Specifically, a sensor body integrated with a bezel and a vibration retaining member is inserted into a hole of the bumper from outside thereof. The bezel is configured as a cylindrical member having a hollow portion and made of synthetic resin or the like. Thereafter, a retainer is attached to a back side portion of the bumper. The retainer is a member for fixing the sensor body and the bezel onto the bumper and made of synthetic resin or the like.

As disclosed in the above-described patent literature, according to this type of the ultrasonic sensor, erroneous detection may occur due to a vibration between the ultrasonic sensor and a vehicle component (i.e. bumper or the like) which is an object to which the ultrasonic sensor is attached. Therefore, it is desired that the above-mentioned erroneous detection be avoided by suppressing propagation between the ultrasonic sensor and the vehicle component as much as possible.

EMBODIMENTS

Hereinafter, with reference to the drawings, embodiments of the present disclosure will be described. Note that, various modification examples applicable to one embodiment, if inserted into the series of description of the embodiment, may disturb understanding of the embodiment. Hence, for the modification examples are not inserted into the series of description of the embodiment, but will be described after the embodiment section.

(On-Vehicle Configuration)

Figure 1A:
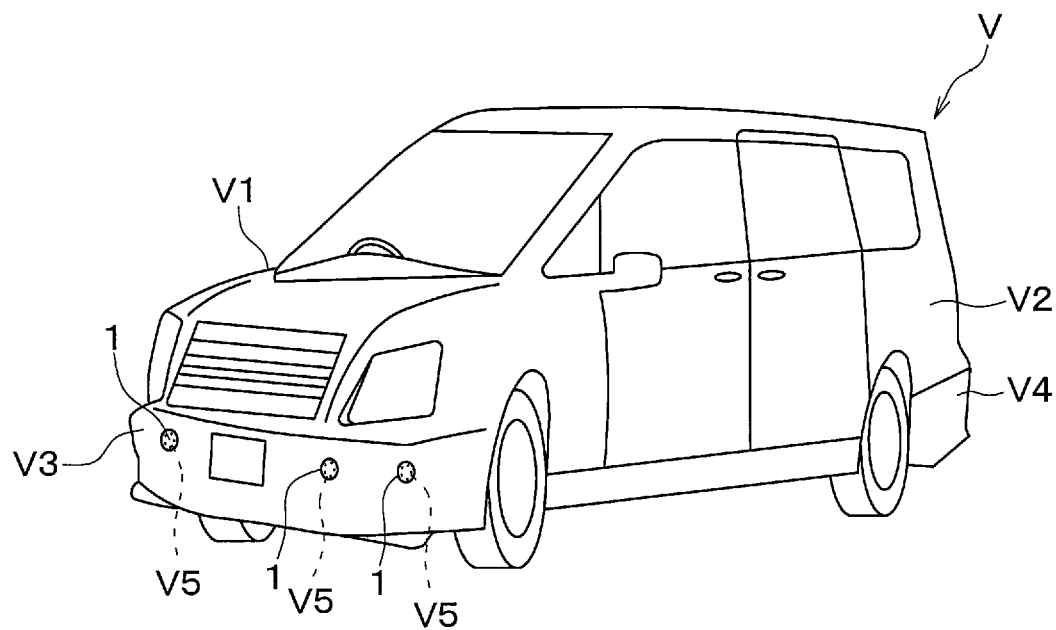
FIG. 1A is perspective view showing an outline of a vehicle in which an ultrasonic sensor according to an embodiment is mounted.

Referring to FIG. 1A, according to the present embodiment, an ultrasonic sensor 1 is provided. The ultrasonic sensor 1 is configured to have an on-vehicle clearance sonar to be mounted on a vehicle V. In other words, the ultrasonic sensor 1 is mounted on the vehicle V to be capable of detecting objects around the vehicle V.

The vehicle V is so-called four-wheel vehicle provided with a vehicle body V1 formed in a box shape. The vehicle body V1 includes, as a plate-shaped vehicle component that constitutes an exterior plate thereof, a vehicle body panel V2, a front bumper V3 and a rear bumper V4. The front bumper V3 is provided at a front end part of the vehicle body V1. The rear bumper V4 is provided at a rear end part of the vehicle body V1. According to the present embodiment, the front bumper V3 and the rear bumper V4 are formed of a metal plate material.

The ultrasonic sensor 1 is mounted on the front bumper V3 to be capable of detecting objects existing in front of and of the vehicle V and a lateral front side of the vehicle V. Similarly, the ultrasonic sensor 1 is mounted on the rear bumper V4 to be capable of detecting objects existing in the rear side and the lateral rear side of the vehicle V. Hereinafter, a state where the ultrasonic sensor 1 is mounted on both the front bumper V3 and the rear bumper V4, thereby being mounted on the vehicle V, is referred to as an on-vehicle state.

The ultrasonic sensor 1 is attached or detached to/from the front bumper V3 when the front bumper V3 is removed from the vehicle V1. Hence, the on-vehicle state includes a mounted state where the ultrasonic sensor 1 is mounted on the front bumper V3. The same applies to a case where the ultrasonic sensor 1 is attached or detached to/from the rear bumper V4.

According to the present embodiment, in the on-vehicle state, a plurality of ultrasonic sensors 1 (e.g. four sensors) are mounted on the front bumper V3. The respective ultrasonic sensors 1 mounted on the front bumper V3 are arranged at different positions in the vehicle width direction. Similarly, a plurality of ultrasonic sensor 1 (e.g. four sensors) are mounted on the rear bumper V4. For the front bumper V3 and the rear bumper V4, a mounting hole V5 is provided as a through hole to which the ultrasonic sensor 1 is mounted.

Figure 1B:
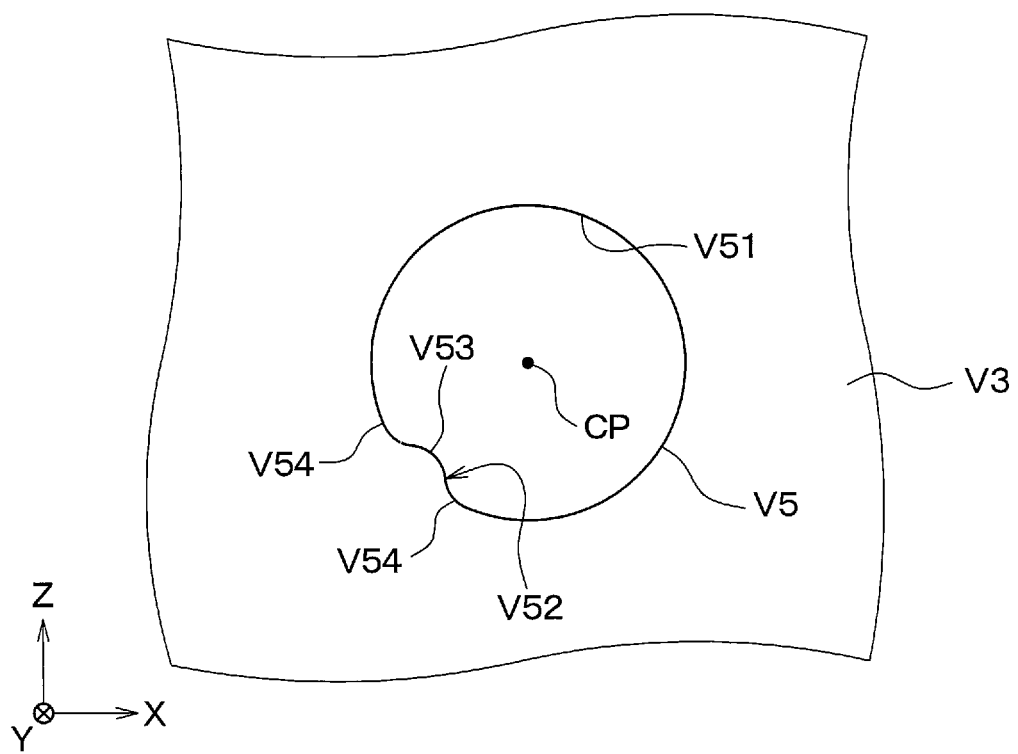
FIG. 1B is a rear view showing an enlarged portion around a mounting hole of a front bumper shown in FIG. 1A.

As shown in FIG. 1B, a bumper side engaging member V52 is provided in the mounting hole V5 in order to avoid erroneous mounting of the ultrasonic sensor 1. The erroneous mounting includes a case where an ultrasonic sensor 1 having an erroneous part number which is different from the one to be mounted to the mounting hole V5 in a specific vehicle V is present. Further, the erroneous mounting includes a case where an ultrasonic sensor 1 having correct part number is mounted to the mounting hole V5 with a mount posture different from the original mount position. The mount posture refers to a rotation position of which the center is the directional axis of the ultrasonic sensor 1 in the mounted state. The directional axis refers to a virtual linear line extending in a transmission—reception direction of ultrasonic waves from the ultrasonic sensor 1, which is a reference of a directional angle. The directional axis is also referred to as a directional center axis or a detection axis.

The bumper side engaging member V52 includes a portion of the mounting hole V5 where the hole diameter changes. The mounting hole V5 is a through hole formed in substantially circular shape. The bumper side engaging member V52 is provided at a predetermined position in the circumferential direction of the mounting hole V5. The hole diameter of the mounting hole V5 is a distance from the center position of the mounting hole V5 to an inner edge V51. The center position CP is a center of an arc shaped portion of the mounting hole V5 in a front view except the bumper side engaging member V52. Specifically, the center position CP refers to a center position of an arc which constitutes an intersection line between the inner edge V51 as a cylindrical inner surface in the mounting hole V5 and a bumper outer surface V31 or a bumper back surface V32 shown in FIG. 2A (described later). The center position CP also refers to, in the on-vehicle state or the mounted state, a position of the center axis line CL on a XZ-plane shown in FIG. 2A.

According to the present embodiment, as shown in FIG. 1B, the bumper side engaging member V52 includes a bumper side convex portion V53 and a pair of bumper side concave portion V54. The bumper side convex portion V53 is a portion having a convex shape protruding towards the center position CP in the inner edge V51 of the mounting hole V5 and formed to have a rounded shape at the tip end in the protruding direction in a front view. The bumper side concave portion V54 is provided at portions in both ends of the bumper side convex portion V53 in the circumferential direction, being formed in a concaved shape relative to the bumper side convex portion V53 and having a rounded shape in front view.

First Embodiment

FIGS. 2A to 2D illustrate one sensor among the plurality of ultrasonic sensors 1 mounted on the front bumper V3 in an on-vehicle state. Hereinafter, with reference to FIG. 2A and the like, configurations according to the first embodiment will be described with an example with one sensor among the plurality of ultrasonic sensors 1 mounted on the front bumper V3.

For convenience of explanation, as shown in the drawings, a right-handed XYZ rectangular coordinate system is set with respect to the gravity direction in the on-vehicle state. In the right-handed XYZ rectangular coordinate system, an upward direction along vertically upward direction is referred to as Z-axis positive direction. The vertically upward direction is a direction opposite to the gravity direction in the case where the vehicle V is stably disposed on a horizontal plane in a state of capable of travelling. The upward direction refers to a direction forming a predetermined small acute angle α with a vertically upward direction. The acute angle α is 10° or less. Hence, depending on the shape of the front bumper V3, the Z-axis positive direction may be the same as the vertically upward direction or a direction orthogonal to the vertically upward direction. Similarly, a Y-axis positive direction may be the same as the horizontal direction or a direction orthogonal to the horizontal direction.

Figure 2A:
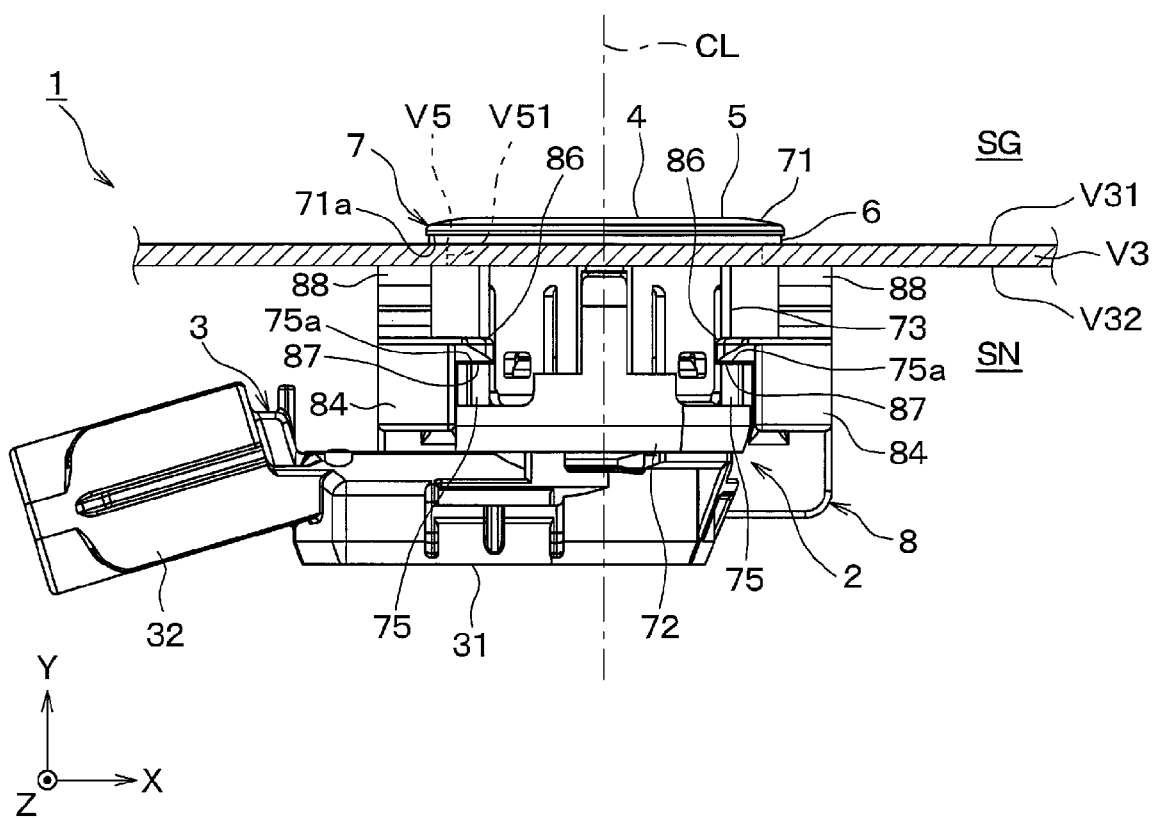
FIG. 2A is a plan view showing the ultrasonic sensor shown in FIG. 1A in a state of being mounted on the vehicle.

Referring to FIG. 2A, the front bumper V3 includes a bumper outer surface V31 and a bumper back surface V32. The bumper outer surface V31 is an outer surface of the front bumper V3 and disposed to face a bumper outer space SG as a space outside the vehicle V in the on-vehicle state. The bumper back surface V32 is a back surface of the bumper outer surface V31 and disposed to face a bumper inner space SN as a space inside the vehicle V in the on-vehicle state. The mounting hole V5 opens towards the bumper outer surface V31 and the bumper back surface V32, thereby penetrating through the front bumper V3 in the thickness direction thereof. The mounting hole V5 is formed as a round hole having a cylindrical shaped space inside thereof. In other words, the mounting hole V5 has an inner edge V51 as a cylindrical inner surface.

The ultrasonic sensor 1 is configured to be capable of transmitting and receiving ultrasonic waves. That is, the ultrasonic sensor 1 is configured to emit probing waves as ultrasonic waves towards bumper outside space along the center axis line CL. Further, the ultrasonic sensor 1 is configured to receive the receiving waves including the reflected waves of the probing waves, generate and output the detection signal depending on the reception result of the receiving waves.

In the right-hand XYZ coordinate system, a Y-axis positive direction is defined as the emission direction of the probing waves parallel to the center axis line CL that constitutes the directional angle of the ultrasonic sensor 1. The Y-axis positive direction parallel to the center axis line CL is referred to as axial direction. Hereinafter, among both ends in the axial direction of a component extending in the axial direction, one in the Y-axis positive direction side may be referred to as a tip end in the axial direction, and one in the Y-axis negative direction side may be referred to as a base end in the axial direction. Further, a dimension in the axial direction of some members or portions is simply referred to as axial-direction dimension.

Further, any directions orthogonal to the axial direction refers to in-plane direction. The in-plane direction is a direction parallel to the XZ plane. In some members, a shape in the plane orthogonal to the center axis line CL, that is, a shape protruded on the XZ plane may be referred to as in-plane shape.

The in-plane direction includes radial direction and circumferential direction. The radial direction is a direction extending radially from the center axis line CL. That is, the radial direction is a direction crossing the center axis line CL at a right angle and separating from the center axis line CL. Specifically, when drawing a half-line on a virtual plane orthogonal to the center axis line CL from a cross point between the virtual plane and the center axis CL as an origin, the radial direction is a direction where the half-line extends. That is, the radial direction is, when drawing a virtual circle on the virtual plane where the center is the cross point between the virtual plane and the center axis CL. The circumferential direction refers to a circumferential direction of the virtual circle surrounding the center axis line CL.

According to the present embodiment, the ultrasonic sensor 1 is mounted to the vehicle V in the on-vehicle state such that the center axis line CL is substantially parallel to the thickness direction of the front bumper V3 in the vicinity of the mounting position of the ultrasonic sensor 1. The mounting position is a position where the ultrasonic sensor 1 is mounted on the front bumper V3. The mounting position is ideally the center position CP of the mounting hole V5.

Referring to FIGS. 2A to 2D, the sensor body 2 that constitutes the body of the ultrasonic sensor 1 is provided with a sensor case 3, an ultrasonic microphone 4, a cushion member 5. The sensor body 2 is mounted to the front bumper V3 by using an anti-vibration spacer 6, a bezel 7 and a retainer 8. Hereinafter, detailed respective configurations that constitute the ultrasonic sensor 1 will be described.

(Sensor Case)

Figure 2B:
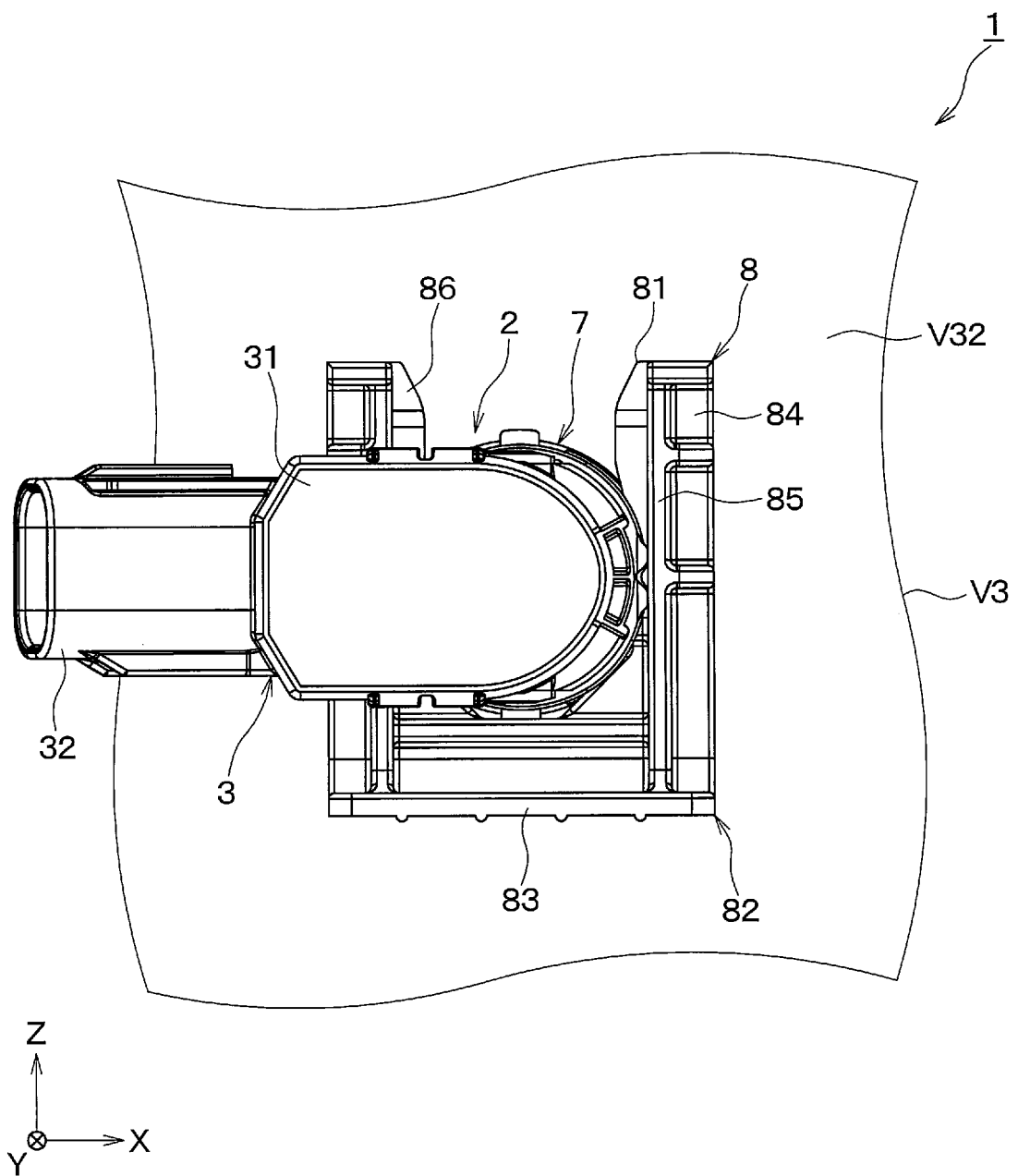
FIG. 2B is a rear view showing the ultrasonic sensor shown in FIG. 1A in a state of being mounted on the vehicle.
Figure 2C:
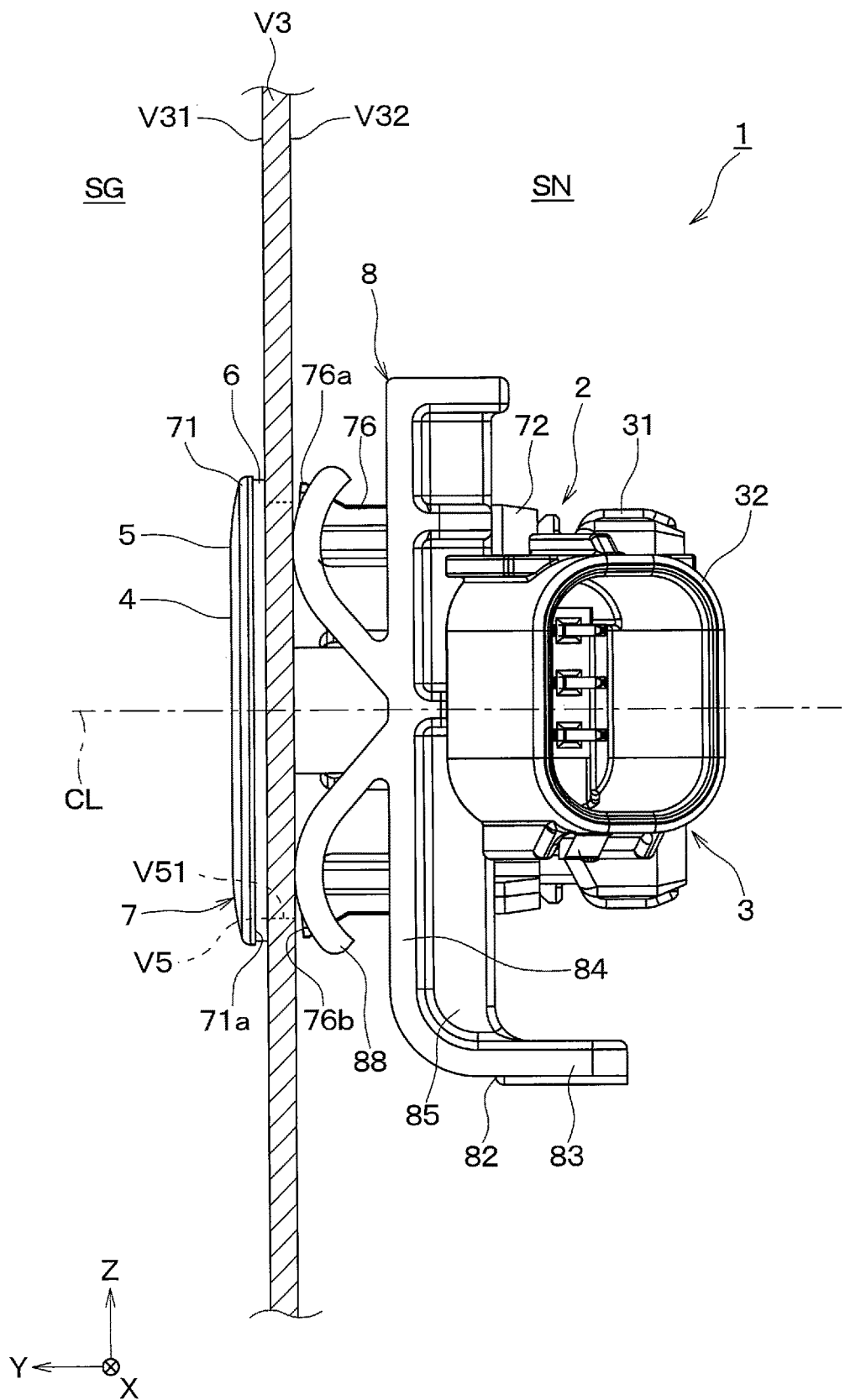
FIG. 2C is a right side view showing the ultrasonic sensor shown in FIG. 1A in a state of being mounted on the vehicle.
Figure 2D:
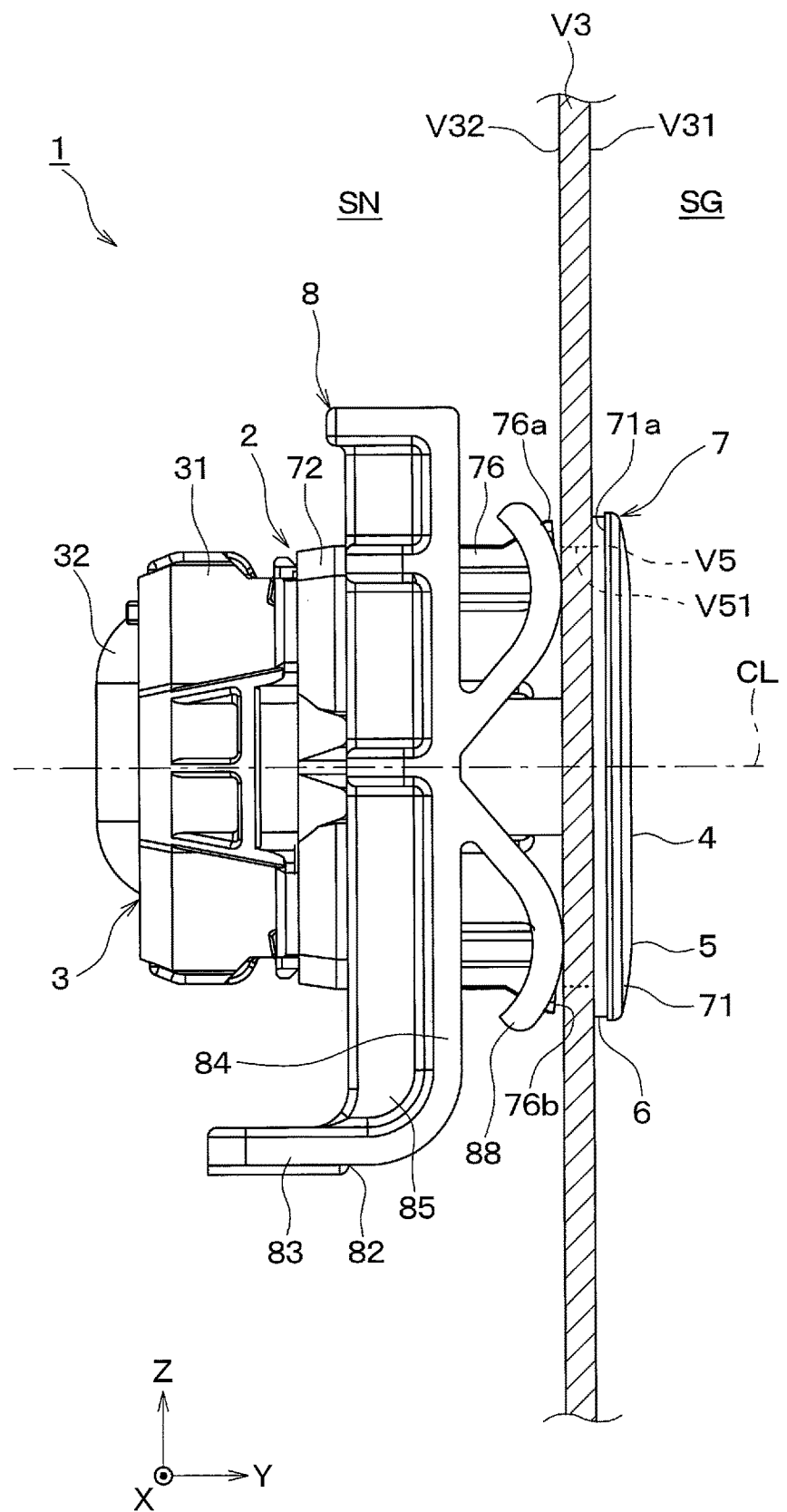
FIG. 2D is a left side view showing the ultrasonic sensor shown in FIG. 1A in a state of being mounted on the vehicle.
Figure 3A:
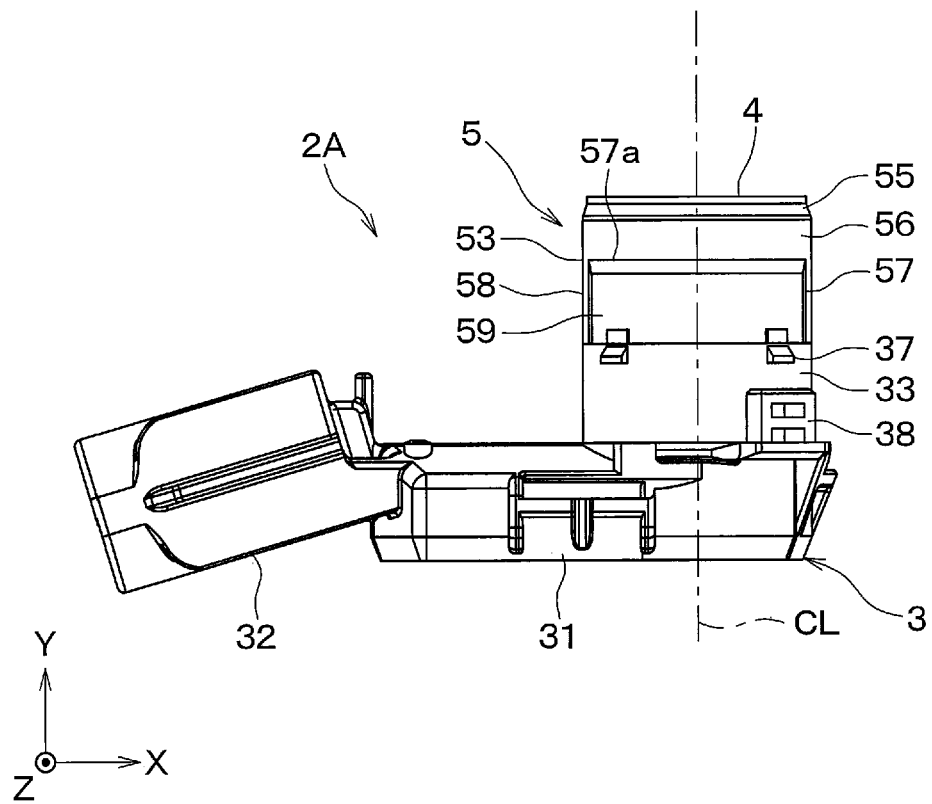
FIG. 3A is a plan view showing an overall configuration of a sensor body of the ultrasonic sensor shown in FIG. 2A.
Figure 3B:
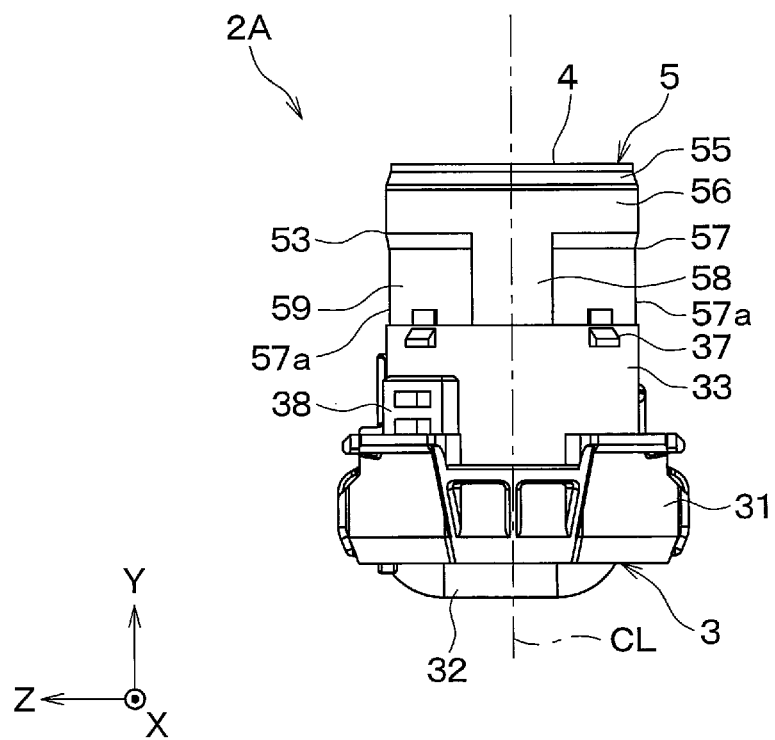
FIG. 3B is a left side view of the sensor body shown in FIG. 3A.

FIGS. 3A and 3B illustrate a state where a retainer 8 is detached from the ultrasonic sensor 1 in the mounted state shown in FIGS. 2A to 2D, the secondary assembly is pull out towards the bumper outer space SG, and then the bezel 7 is removed from the secondary assembly. The secondary assembly is an assembly in which the anti-vibration spacer 6 and the bezel 8 are mounted to the sensor body 2 as a primary assembly including the ultrasonic microphone 4 and the cushion member 5 which are mounted to the sensor case 3. Note that a state where the secondary assembly is formed may be referred to as assembled state. The mounted state and the on-vehicle state also correspond to the assembled state.

Referring to FIGS. 3A and 3B, the sensor case 3 that constitute a housing of the ultrasonic sensor 1, that is, the sensor body 2, includes a box part 31, a connector 32 and a microphone supporting part 33. The sensor case 3 is integrally formed by hard synthetic resin such as polybutylene terephthalate, ABS resin, polypropylene, polycarbonate and polystyrene.

Figure 4:
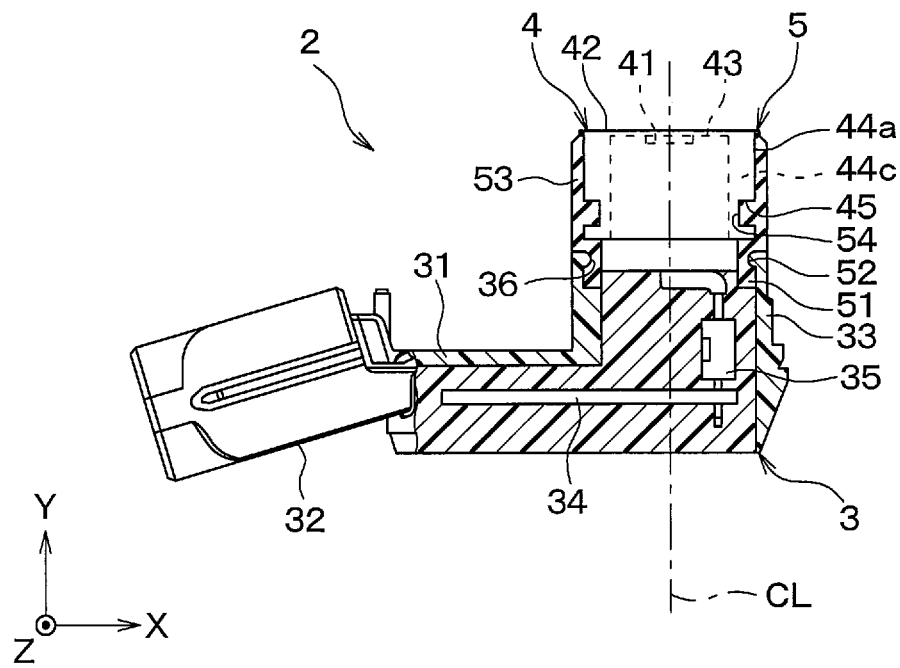
FIG. 4 is a partial cross-sectional view showing an overall configuration of the sensor body shown in FIG. 3A.

The box part 31 is formed in a box shape in the mounted state, having an outline in which the longitudinal side is in the X axis direction and the thinner side is in the Y axis direction. As shown in FIG. 4 which is a partial cross-sectional view of FIG. 3A, a circuit board 34 is accommodated inside the box part 31. The circuit board 34 is electrically connected to the ultrasonic microphone 4 via a connection wiring 35.

The connector 32 is provided extending, in the on-vehicle state, from one end in the longitudinal side of the box part 31 (i.e. left end portion shown in FIG. 2A and FIG. 3A) towards substantially horizontal direction side and diagonally backward side. The connector 32 extends in a direction separating from the front bumper V3 in the mounted state. The connector 32 has a configuration of a receptable connector capable of being attached or detached to from a plug connector (not shown) provided in the end portion of a wire harness for electrically connecting with an external device such as ECU (electronic control unit).

The microphone supporting part 33 extends in the axial direction from other end in the longitudinal side of the box part 31 (i.e. right end portion shown in FIG. 2A and FIG. 3A). The microphone supporting part 33 has a cylindrical shape surrounding the center axis line CL. According to the present embodiment, the microphone supporting part 33 is formed in a cylindrical shape of which the axis center is the center axis line CL.

As shown in FIGS. 3A, 3B and 4, at the tip end of the microphone supporting part 33 in the axial direction, a cushion protruded lock portion 36 and a bezel protruded lock portion 37 are provided. The cushion protruded lock portion 36 is a protrusion protruding from an inner wall surface of the cylindrical inner surface that surrounds the center axis line CL in the microphone supporting part 33, towards the center axis line CL. The cushion protruded lock portion 36 extends in the circumferential direction. The bezel protruded lock portion 37 is a small protrusion protruding from an outer wall surface of a columnar surface that surrounds the center axis line CL in the microphone supporting part 33, towards the radial direction. A plurality of bezel protruded lock portions 37 are arranged in the circumferential direction.

(Ultrasonic Microphone)

Figure 5:
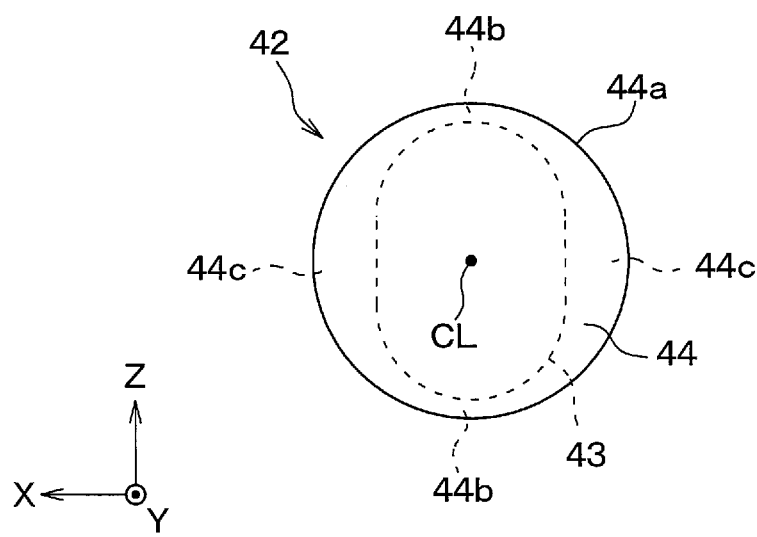
FIG. 5 is a front view showing a microphone casing shown in FIG. 4.

With reference to FIGS. 4 and 5, the ultrasonic microphone 4 has an outline formed in a column shape extending in the axial direction. Specifically, according to the present embodiment, the ultrasonic microphone 4 is formed in a substantially cylindrical shape where the center thereof is the center axis line CL.

The ultrasonic microphone 4 is provided with an ultrasonic element 41 and a microphone case 42. The ultrasonic element 41 serves as a so-called electromechanical transducer and is composed of piezoelectric element.

The microphone case 42 that constitutes the housing of the ultrasonic microphone 4 is formed in a bottomed cylindrical shape with metal material such as aluminum. The microphone case 42 includes a diaphragm 43 and a side plate 44.

The diaphragm 43 is formed in a thin plate shape having a thickness direction in the axial direction. The diaphragm 43 is provided to close a tip end of the side plate 44 in the axial direction. In the diaphragm 43, an outer surface facing the bumper outer space SG in the mounted state or the on-vehicle state is formed in a smooth plate shape. In the diaphragm 43, the ultrasonic element 41 is fixed on an inner surface as a back side of the outer surface.

As shown in FIG. 5, the diaphragm 43 is formed to have a longitudinal direction and a short side direction in which in-plane shapes mutually cross at a right angle. Specifically, the diaphragm 43 has an in-plane shape of an elliptic shape having a longitudinal direction along vertically upward and downward direction.

The side plate 44 is a portion having a substantially cylindrical shape in the microphone case 42, extending in the axial direction. The side plate 44, that is, a side surface 44a constituting the outer wall surface of the ultrasonic microphone 4 is formed in a cylindrical shape in which the center axis thereof is the center axis line CL.

The side plate 44 includes a thin part 44b and thick part 44c corresponding to the in-plate shape of the diaphragm 43. The thin part 44b is provided at a portion corresponding to both ends in the longitudinal direction of the diaphragm 43. A pair of thin parts 44b are arranged symmetrically across the center axis line CL while being arranged in substantially vertical upward and downward direction in the on-vehicle state. On the other hand, the thick part 44c is provided at a portion corresponding to both ends in the short side direction of the diaphragm 43. The pair of thick parts 44c are arranged symmetrically across the center axis line CL while being arranged in substantially horizontal direction in the on-vehicle state.

A pair of engagement grooves 45 are formed in the side plate 44. The engagement grooves 45 are each formed as a square groove extending parallel to the Z axis direction in the drawings, and provided in the thick part 44c. The pair of engagement grooves 45 are arranged symmetrically across the center axis line CL.

(Cushion Member)

Hereinafter, with reference to mainly FIGS. 3A, 3B, FIGS. 4 and 5, a detailed configuration of a cushion member 5 that constitutes a vibration absorber of the present disclosure will be described.

The cushion member 5 is a member used for mounting the ultrasonic sensor 1 to the front bumper V3 as a plate shaped vehicle component. The cushion member 5 is integrally formed without any joints by synthetic resin based elastic material such as silicone rubber. According to the present embodiment, the cushion member 5 together with the ultrasonic microphone 4 as components constituting the sensor body 2, are provided in advance in the sensor body 2 as a primary assembly.

The cushion member 5 is formed in a cylindrical member surrounding the center axis line CL. Specifically, according to the present embodiment, the cushion member 5 is formed in substantially cylindrical shape, having substantially the same outer diameter as that of the microphone supporting part 33 and substantially the same inner diameter as that of the side plate 44 with the axis center of the center axis line CL. Also, the cushion member 5 is formed to have an axial dimension larger than that of the ultrasonic microphone 4.

The cushion member 5 is fixed to the microphone supporting part 33 at a supported part 51 as a base end in the axial direction. Specifically, an engagement groove 52 opened in the radial direction is formed at the supported part 51. The engagement groove 52 has a shape allowing the cushion protruded lock portion 36 provided in the microphone supporting part 33 to be engaged therewith. The engagement groove 52 extends in the circumferential direction.

The microphone accommodation part 53 is provided at a further tip end side in the axial direction than the supported part 51 of the cushion member 5 is. The microphone accommodation part 53 is configured to accommodate substantially an entire part of the ultrasonic microphone 4 in the axial direction. That is, the microphone accommodation part 53 includes an internal space having a column shape corresponding to the outline of the ultrasonic microphone 4 so as to cover the side surface 44a of the ultrasonic microphone 4.

For the microphone accommodation part 53, a pair of protruded lock portions 54 are provided. The pair of protruded lock portions 54 are arranged facing with each other across the center axis line CL. The protruded lock portions 54 serve as protruded thread part having a shape capable of engaging with the engagement groove 45 as a square groove and protruding towards the center axis line CL. The protruded thread part has a rectangular shape in the cross-sectional view and extends in the Z-axis direction shown in FIGS. 3A, 3B, FIGS. 4 and 5.

Thus, the cushion member 5 is provided to elastically support the microphone 4 at the tip end side in the axial direction while being fixed to the sensor case 3 at the based end side in the axial direction. That is, according to the ultrasonic sensor 1 according to the present embodiment, the ultrasonic microphone 4 is elastically supported by the sensor case 3 via the cushion member 5, thereby suppressing propagation of vibration between the sensor case 3 and the ultrasonic microphone 4.

Further, the cushion member 5 is provided, in the on-vehicle state, to be interposed between the bezel 7 surrounding the side surface 44a of the ultrasonic microphone 4 and the ultrasonic microphone 4. The cushion member 5 is interposed between the ultrasonic microphone 4 and the front bumper V3, thereby suppressing propagation of vibration between the ultrasonic microphone 4 and the front bumper V3.

The microphone accommodation part 53 in the cushion member 5 is provided with a tip end portion 55, a first cylindrical portion 56 and a second cylindrical portion 57. The tip end portion 55, the first cylindrical portion 56 and the second cylindrical portion 57 are arranged in this order in the axial direction.

The tip end portion 55 is positioned at the most tip end side of the cushion member 5 in the axial direction, and formed in a tapered shape having an outer wall surface as a partial conical surface where the outer diameter becomes smaller towards the tip end side in the axial direction and an inner wall surface as a cylindrical inner surface.

The first cylindrical portion 56 is positioned adjacent to the tip end portion 55 in the axial direction and provided in the tip end side of the cushion member 5 in the axial direction. The first cylindrical portion 56 contacts with the ultrasonic microphone 4 and the bezel 7 and supported between the ultrasonic microphone 4 and the bezel 7. In other words, the first cylindrical portion 56 has a maximum thickness which is substantially the same as the dimension of a gap between the side surface 44a of the ultrasonic microphone 4 and the bezel 7 in the assembled state. According to the present embodiment, the first cylindrical portion 56 is formed in a cylindrical shape in which the thickness, that is, the radial dimension is constant. In other words, the first cylindrical portion 56 is provided to contact with the ultrasonic microphone 4 and the bezel 7 entirely in the circumferential direction.

The second cylindrical portion 57 is provided to be adjacent to the first cylindrical portion 56 in the base end side in the axial direction. The second cylindrical portion 57 has a pair of concave portions 57a that open in the radial direction. The pair of concave portions 57a are symmetrically provided across the center axis line CL.

The second cylindrical portion 57 includes a large diameter portion 58 and a small diameter portion 59. The large diameter portion 58 contacts with the ultrasonic microphone 4 and the bezel 7 and supported between the ultrasonic microphone 4 and the bezel 7. Specifically, the large diameter portion 58 has partial cylindrical shape having a maximum thickness which is substantially the same as the dimension of a gap between the side surface 44a of the ultrasonic microphone 4 and the bezel 7 in the assembled state. The large diameter portion 58 is formed such that the diameters of the inner wall surface and the outer wall surface relative to the center axis line CL as the center thereof are substantially the same as that of the first cylindrical portion 56.

The small diameter portion 59 is provided to be adjacent to the large diameter portion 58 in the circumferential direction and formed to have the outer diameter relative to the center axis line CL as the center thereof which is smaller than that of the large diameter portion 58. For the small diameter portion 59, the concave portion 57a is provided in the second cylindrical portion 57, whereby the small diameter portion 59 is formed thinner than the larger diameter portion 58. The small diameter portion 59 is provided at a portion corresponding to the concave portion 57a in the circumferential direction. That is, the small diameter portion 59 is formed such that the gap formed with the bezel 7 is larger than that of the large diameter 58. The small diameter portion 59 is formed such that the diameter of the inner wall surface of which the center is the center axis CL is substantially the same as that of the first cylindrical portion 56.

A pair of large diameter portions 58 are disposed to face with each other across the center axis line CL. Further, a pair of small diameter portions 59 are disposed to face with each other across the center line CL. Specifically, one of the pair of large diameter portions 58, one of the pair of small large members 59, the other one of the pair of large diameter members 58, and the other one of the small diameter portions 59 are adjacently arranged in this order in the circumferential direction. Further, the cushion member 5 is configured such that a direction where the pair of large diameters 58 positioned across the center line CL are arranged and a direction where the pair of small diameter portions 59 positioned across the center line CL are arranged, cross each other at a right angle.

According to the present embodiment, a length in the circumferential direction of the large diameter portion 58 is formed to be shorter than that of the small diameter portion 59. Also, as is clear from FIGS. 3A, 3B and 5, the large diameter portions 58 are provided at a portion corresponding to both ends in the short side direction of the diaphragm 43. On the other hand, the small diameter portions 59 are provided at a portion corresponding to both ends in the longitudinal direction of the diaphragm 43.

(Anti-Vibration Spacer)

Figure 6A:
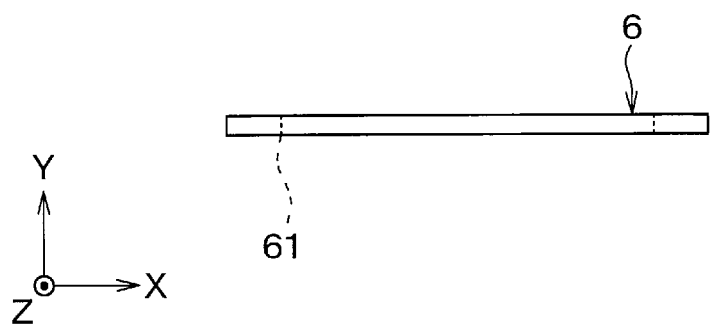
FIG. 6A is a plan view showing an enlarged view of an anti-vibration spacer shown in FIG. 2A.
Figure 6B:
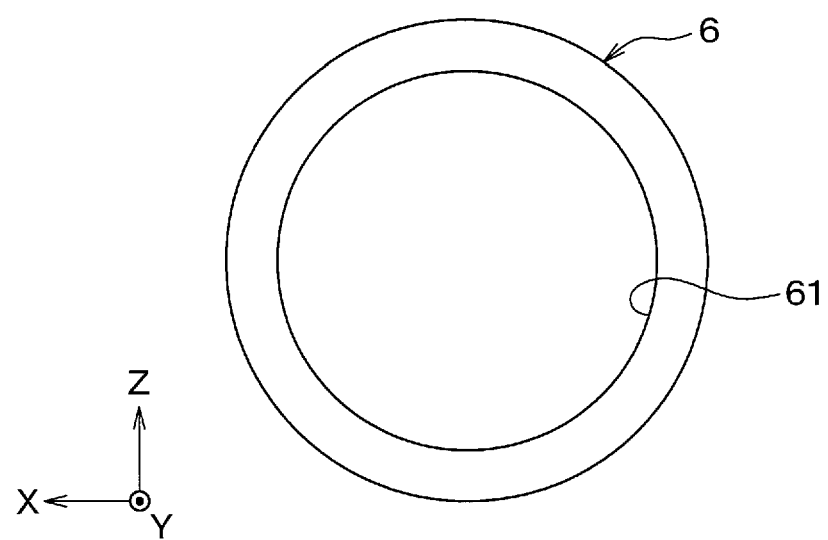
FIG. 6B is a front view showing the anti-vibration spacer shown in FIG. 4A.

Referring to FIGS. 6A and 6B, the anti-vibration spacer 6 is a ring-shaped member having a thickness direction in the axial direction and formed of a synthetic resin based elastic material such as silicone rubber. According to the present embodiment, the anti-vibration spacer 6 has a shape in which a spacer through hole as a circular through hole is drilled at the center position of a disc-shaped member.

As shown in FIGS. 2A and 2C, in the on-vehicle state, the anti-vibration spacer 6 is provided between a flange portion 71 (described later) in the bezel 7 and the front bumper V3 so as to suppress propagation of vibration between the bezel 7 and the front bumper V3. That is, the anti-vibration spacer 6 is supported between a back surface 71a as a surface facing the front bumper V3 in the flange portion 71 and the bumper outer surface V31, to be interposed between the bezel 7 and the front bumper V3 in the on-vehicle state.

(Bezel)

Figure 7:
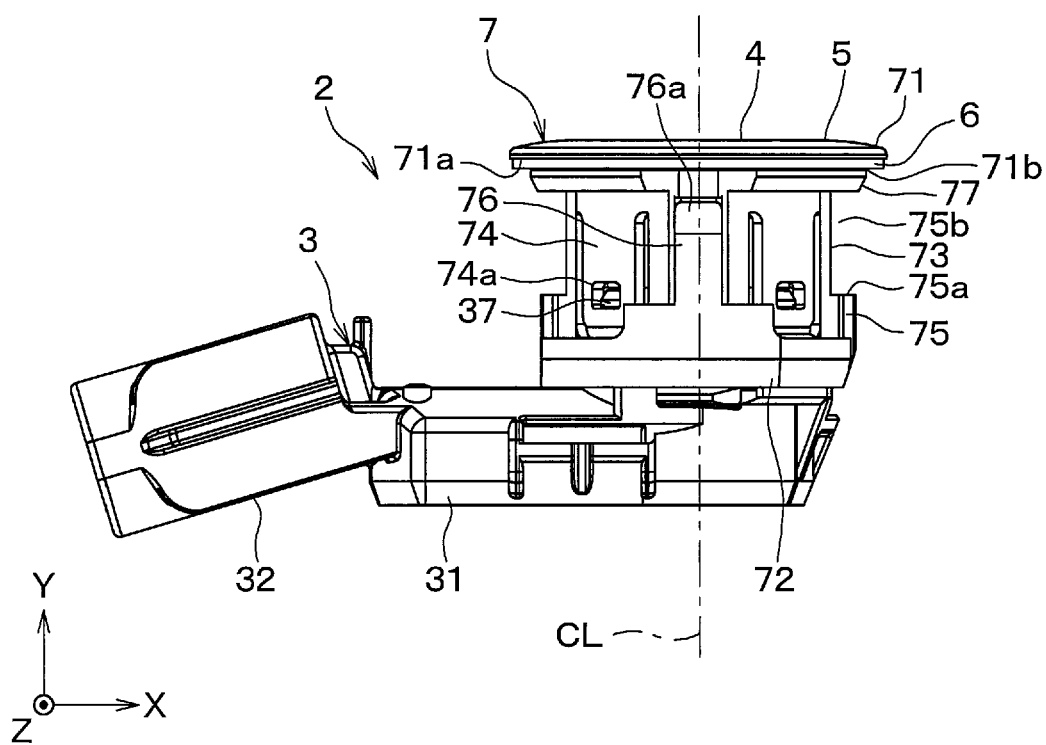
FIG. 7 is a plan view showing an overall configuration of a secondary assembly in which the sensor body, the anti-vibration spacer and the bezel shown in FIG. 2A are combined.
Figure 8A:
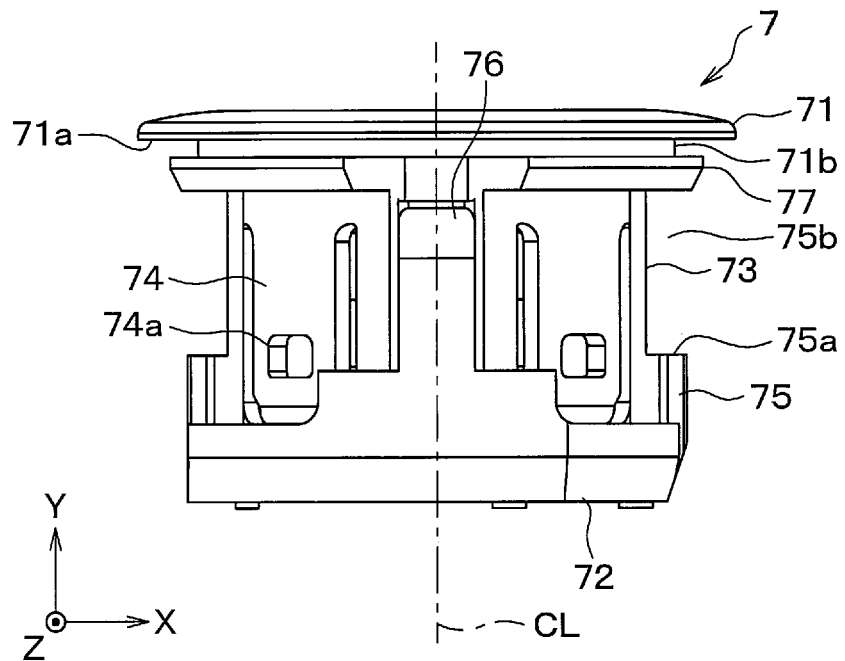
FIG. 8A is a plan view showing an enlarged view of the bezel shown in FIG. 7.
Figure 8B:
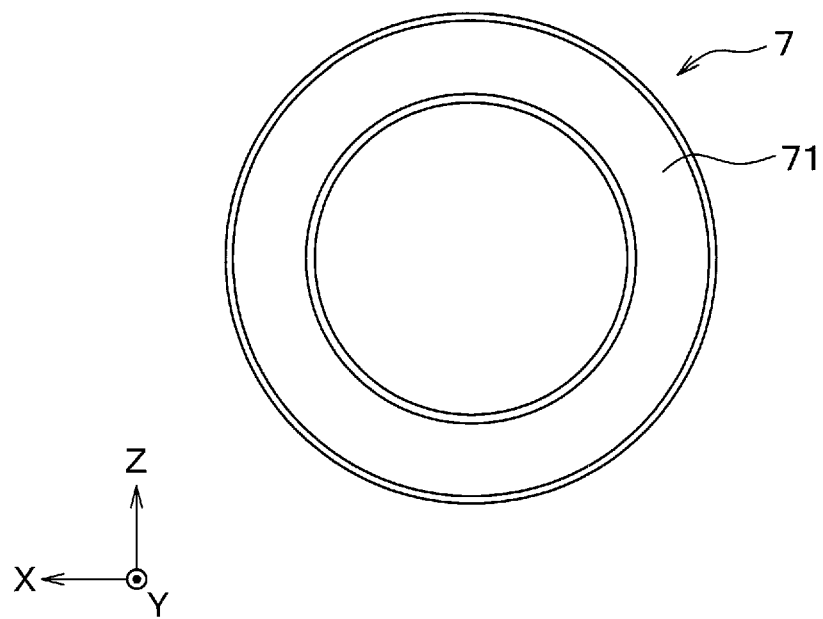
FIG. 8B is a front view of the bezel shown in FIG. 8A.
Figure 8C:
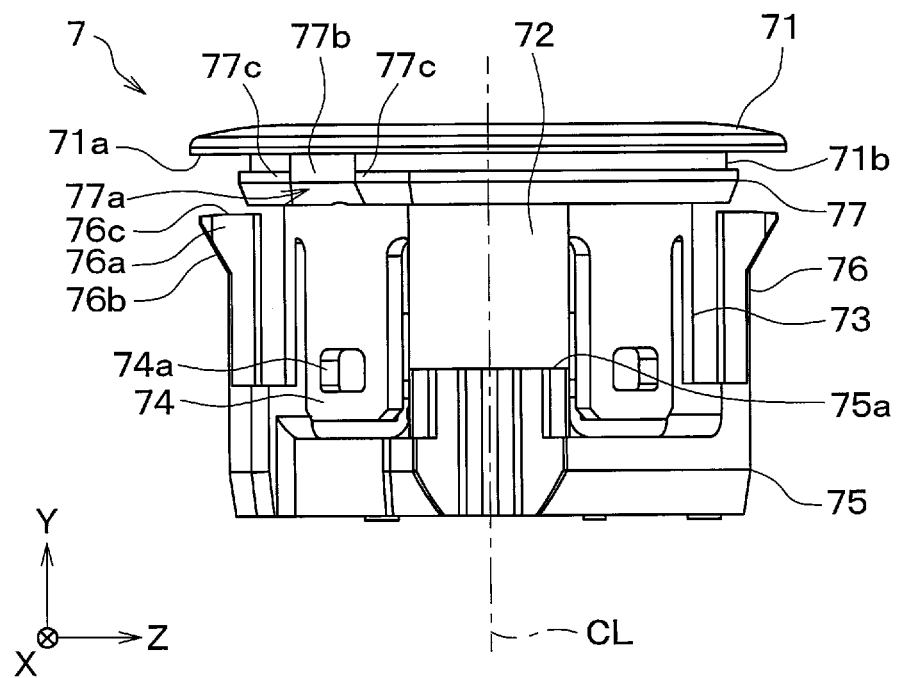
FIG. 8C is a right side view of the bezel shown in FIG. 8A.
Figure 9A:
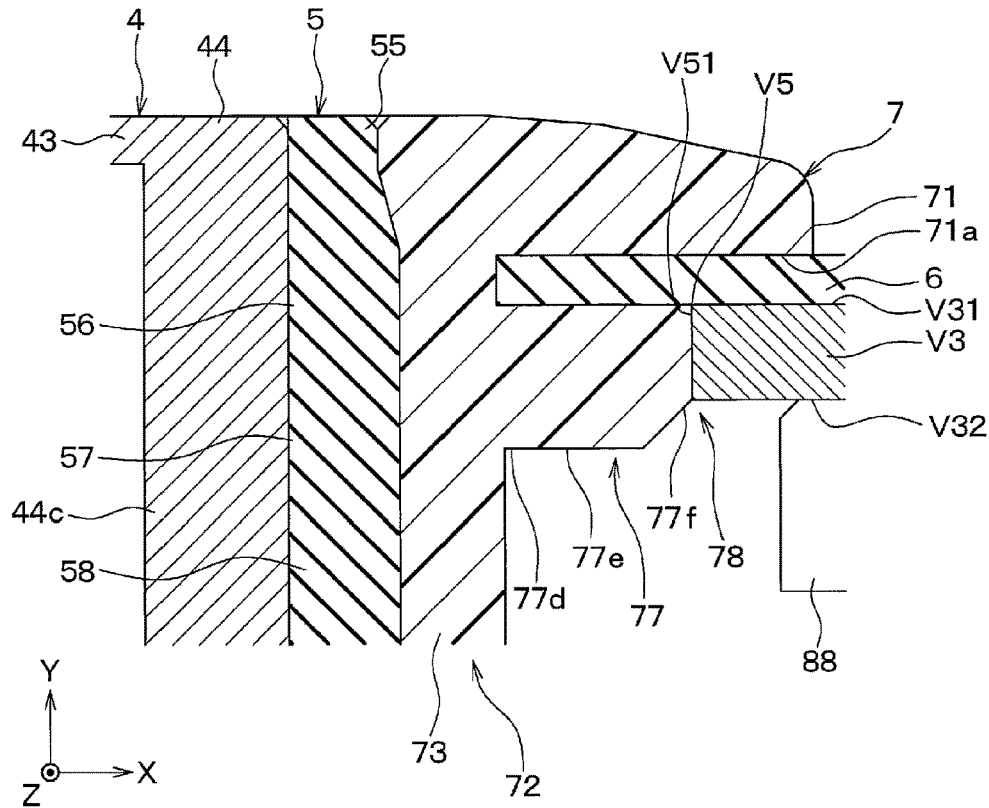
FIG. 9A is a cross-sectional view showing a part of the bezel and a portion in the vicinity of the bezel in a state of being mounted to the vehicle according to a first embodiment.
Figure 9B:
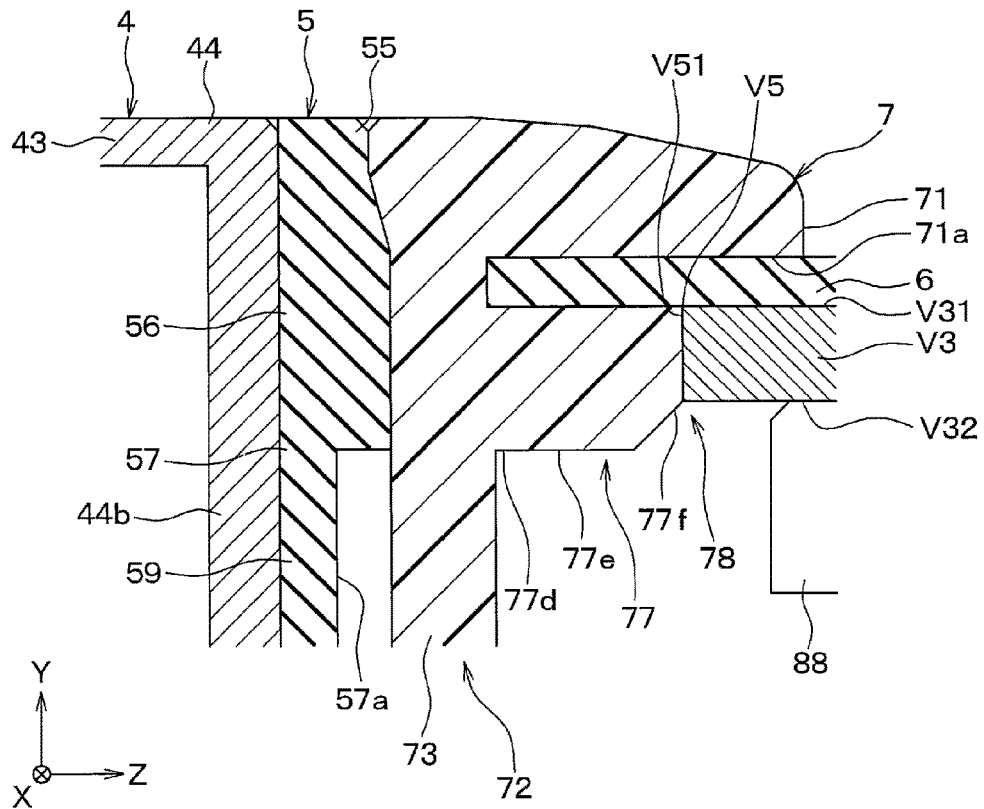
FIG. 9B is a cross-sectional view showing a part of the bezel and a portion in the vicinity of the bezel in a state of being mounted to the vehicle according to the first embodiment.

FIG. 7 illustrates the above-described secondary assembly. FIGS. 8A to 8C show an overall configuration of the bezel 7. FIGS. 9A and 9B are cross-sectional views of an enlarged portion in the vicinity of a flange portion 71 of the bezel 7 in the mounted state or the on-vehicle state. FIG. 9A is a cross-sectional sectioned along a plane parallel to the XY plane including the center axis line CL. FIG. 9B is a cross-sectional sectioned along a plane parallel to the YZ plane including the center axis line CL. Hereinafter, a confirmation of the bezel 7 as a sensor mounting device according to the present embodiment will be described.

The bezel is used for mounting the ultrasonic sensor 1 on the front bumper V3 as a plate-shaped vehicle component, and integrally formed by hard synthetic resin.

The flange portion 71 is provided at a tip end of the bezel 7 in the axial direction. The flange portion 71 is a ring-shaped portion having a thickness direction in the axial direction, and protrudes in the radial direction. The flange portion 71 is formed to have an outer diameter larger than that of the inner diameter of the mounting hole V5. That is, the flange portion 71 is provided, as shown in FIG. 2A and the like, to face a portion in the vicinity of the mounting hole V5 of the bumper outer surface V31 across the anti-vibration spacer 6 in the mounted state.

In a portion adjacent to the flange portion 71 positioned in a base end side from the flange portion 71 in the axial direction, a spacer accommodation groove 71b for accommodating the anti-vibration spacer 6 is provided opening towards the radial direction. The spacer accommodation groove 71b is formed having an axial dimension which is a width corresponding to the thickness of the anti-vibration spacer 6, and a radial dimension which is a depth corresponding to the diameter of the spacer through hole 82 in the anti-vibration spacer 6. The spacer accommodation groove 71b extends in the entire bezel 7 in the circumferential direction.

The spacer accommodation groove 71b is provided between the flange portion 71 and the cylindrical portion 72. That is, the flange portion 71 protrudes in the radial direction in the one end portion of the cylindrical portion 72 extended in the axial direction, that is, the tip end portion thereof. The flange portion 71 and the cylindrical portion 72 are integrally formed of the same material without any joints.

The cylindrical portion 72 is provided, in the assembled state and the mounted state, to be accommodated in the mounting hole V5 while surrounding the ultrasonic microphone 4 and the cushion member 5. The cylindrical portion 72 has an outer diameter slightly smaller than the inner diameter of the mounting hole V5 and an inner diameter slightly larger than the outer diameter of the microphone supporting part 33 and the cushion member 5. In the cylindrical portion 72, a portion having a cylindrical shape including the center portion thereof in the axial direction is defined as a body 73 which extends in the center axis line CL.

The body 73 includes a sensor engagement piece 74. The sensor engagement piece 74 is a cantilevered tongue piece having a thickness direction in the radial direction, and extends from a tip end of the body 73 in the axial direction towards the base end thereof. In the sensor engagement piece 74, a fixed end is defined as a tip end in the axial direction, and a free end is defined as a base end in the axial direction. The sensor engagement piece 74 is formed to be capable of being deformed in a state where the free end moves in the radial direction.

An engagement hole 74a is provided at the free end side in the sensor engagement piece 74, penetrating through the sensor engagement piece 74 in the thickness direction thereof. The engagement hole 74a is formed, in the assembled state, to be capable of being attached or detached to from the bezel protruded lock portion 37 provided in the microphone supporting part 33. The body 73 includes the sensor engagement piece 74 as many as the bezel protruded lock portions 37, which are arranged in the circumferential direction.

A base end side projection 75 is provided in the base end of the body 73 in the axial direction. The base end side projection 75 is projected in the radial direction while being integrally coupled with the body 73. According to the present embodiment, the body 73 and the base end side projection 75 are integrally formed of the same material without any joints. A retainer contact surface 75a is provided as an end face in the tip end side of the base end side projection 75 in the axial direction. The retainer contact surface 75a is formed in a smooth planar shape having a normal direction parallel to the center axis line CL.

A retainer insertion groove 75b that opens in the radial direction is formed in a further tip end side from the retainer contact surface 75a in the axial direction. According to the present embodiment, a pair of retainer insertion grooves 75b are symmetrically provided across the center axis line CL. The retainer insertion grooves 75b are spaced such that the retainer 8 is inserted when mounting the ultrasonic sensor 1 on the front bumper V3 and formed in a square groove shape extending in the Z axis direction. In other words, in the mounted state, the base end side projection 75 is configured to support the retainer 8 inserted into the retainer insertion groove 75b between the base end side projection 75 and the bumper back surface V32.

As shown in FIG. 8C, the cylindrical portion 72 has a temporal assembly piece 76. The temporal assembly piece 76 is a cantilevered tongue piece having a thickness direction in the radial direction, and extends from the base end side projection 75 towards the flange portion 71 in the axial direction. That is, the temporal assembly piece 76 is configured to be capable of being elastically deformed in a state where a base end in the axial direction is a fixed end, a tip end in the axial direction is a free end, and the free end moves in the radial direction.

In the free end of the temporary assembled piece 76, that is, the tip end in the axial direction, a temporal assembly protrusion 76a protruding in the radial direction is provided. The temporal assembled protrusion 76a is configured such that the secondary assembly is capable of being supported in a state of being temporally assembled. The temporal assembled state refers to a state where the secondary assembly is temporarily supported by the front bumper V3 in a temporal assembled posture when the bezel 7 of the secondary assembly is inserted into the mounting hole V5. The temporal assembled posture is a posture of the secondary assembly where the anti-vibration spacer 6 contacts or closely faces the bumper outer surface V31 in the front bumper V3, extending in the X-axis negative direction in rear view like the connector 32 as shown in FIG. 2B. The temporal assembled state corresponds to a state where the ultrasonic sensor 1 in the on-vehicle state is removed from the retainer 8.

Specifically, the temporal protrusion 76a has a wedge shaped outline having an inclined surface 76b and a flange opposed surface 76c. The inclined surface 76b is a surface of the temporal assembly protrusion 76a, being exposed in the radial direction, and disposed such that the closer towards the tip end side in the axial direction, the more separated away from the center axis line CL. The flange opposed surface 76c is an end face of the temporal assembly protrusion 76a and provided to face the back surface 71a of the flange portion 71a.

A tip end side projection 77 is provided in the tip end of the body 73 in the axial direction. The tip end side projection 77 is projected in the radial direction while being integrally coupled with the body 73. The tip end side projection 77 is positioned at the most tip end side of the cylindrical portion 72 in the axial direction, and extended in the circumferential direction. According to the present embodiment, the body 73 and the tip end side projection 77 are integrally formed of the same material without any joints.

The tip end side projection 77 is provided between the spacer accommodation groove 71b and the retainer insertion groove 75b in the axial direction. In other words, the tip end side projection 77 is provided to be adjacent to the spacer accommodation groove 71b and the retainer insertion groove 75b in the axial direction. Hence, the spacer accommodation groove 71b is formed to include a gap between the flange portion 71 and the tip end side projection 77. Further, the retainer insertion groove 75b is formed by the space between the base end side projection 75 and the tip end side projection 77.

The tip end side projection 77 has a bezel side engagement portion 77a. The bezel side engagement portion 77a is formed to be engaged with the bumper side engaging member V52. The bezel side engagement portion 77a has a shape corresponding to a shape of the bumper side engaging member V52.

Specifically, according to the present embodiment, the bezel side engagement portion 77a has a bezel side concave portion 77b and a pair of bezel side convex portions 77c. The bezel side concave portion 77b has a shape corresponding to the bumper side convex portion V53. That is, the bezel side concave portion 77b is a concave portion that opens towards the radial direction and disposed at predetermined locations in the circumferential direction of the tip end side projection 77 which extends in the circumferential direction. The bezel side convex portions 77c has a shape corresponding to the bumper side concave portion V54. The bezel side convex portions 77c are formed to be in a relatively convex portion at both ends of the bezel side concave portion 77b in the circumferential direction when providing the bezel side concave portion 77b.

As shown in FIG. 9A and FIG. 9B, the tip end side projection 77 includes a root portion 77d, a middle portion 77e and an end portion 77f. The root portion 77d, the middle portion 77e and the end portion 77f are arranged in the radial direction in this order.

The root portion 77d is a portion which is the closest to the body 73 in the tip end side projection 77, and formed such that the axial dimension is larger than the thickness of the front bumper V3. The middle portion 77e is positioned between the root portion 77d and the end portion 77f, and formed such that the axial dimension is the substantially the same as that of the root portion 77d. The end portion 77f is at a portion the most separating away from the body 73, and formed in a tapered shape such that the closer towards the radial direction, the smaller the axial dimension is.

A through hole opposed portion 78 in the bezel 7 is provided as a part of the cylindrical portion 72. The through hole opposed portion 78 is a portion closely facing the inner edge V51 in the radial direction, capable of contacting with the inner edge V51 of the mounting hole V5 in the mounted state. Specifically, according to the present embodiment, the through hole opposed portion 78 is the tip end side projection 77. In more detail, the through hole facing portion 78 is a surface of the end portion 77f of the tip end side projection 77, closely facing the inner edge V51 in the radial direction.

(Retainer)

As shown in FIGS. 2A to 2D, the retainer 8 as a sensor fixing tool of the present disclosure is assembled to the secondary assembly inserted into the mounting hole V5 in a temporal assembled state, whereby the ultrasonic sensor 1 is fixed to the front bumper V3. Specifically, the retainer 8 is inserted into a portion between the cylindrical portion 72 and the front bumper V3 in a state where the cylindrical portion 72 is inserted into the mounting hole V5, thereby being supported between the cylindrical portion 72 and the front bumper V3 in the on-vehicle state. The retainer 8 is integrally formed by hard synthetic resin.

Figure 10A:
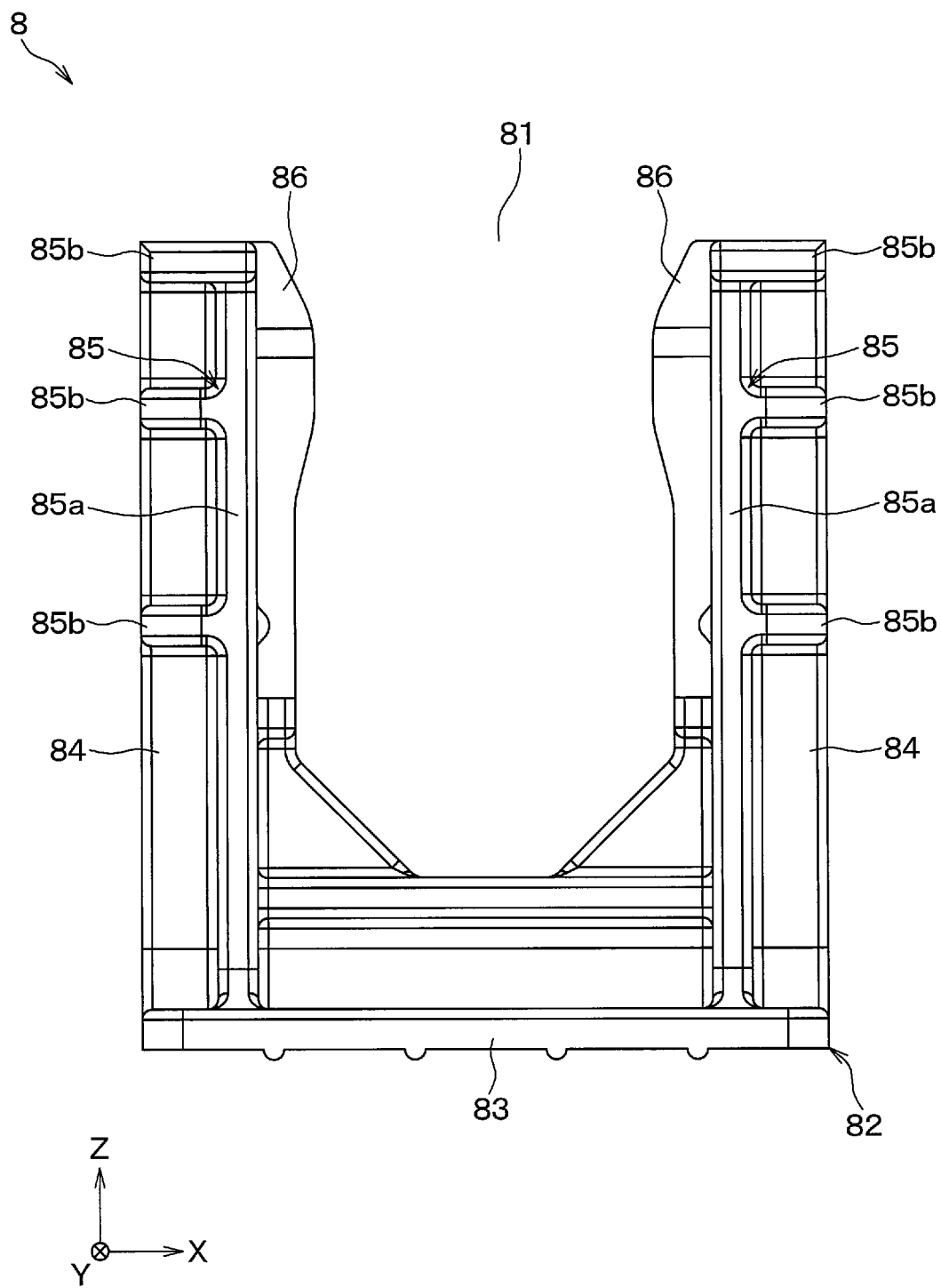
FIG. 10A is a rear view of a retainer shown in FIGS. 2A to 2D.

FIGS. 10A to 10D illustrate an overall configuration of the retainer 8. As shown in FIG. 10A, the retainer is formed in a substantially U-shape in a front view which opens in the Z-axis positive direction in an opening 81. Specifically, a retainer body 82 that constitutes a body of the retainer 8 includes a coupling portion 83 extending in the X-axis direction in FIGS. 10A to 10D and a pair of extending parts 84 extended in the Z-axis positive direction from both ends of the coupling portion 83.

The coupling portion 83 is provided to mutually couple one ends in the pair of extending parts 84. The pair of extending parts 84 are disposed to face with each other across the center axis line CL while extending in a direction crossing the center axis line CL. Then, the coupling portion 83 and the pair of extending parts 84 form the substantially U shape when viewing the retainer 8 in a from view. The pair of extending parts 84 supports the cylindrical portion 72 while accommodating the cylindrical portion 72 of the bezel 7 in an inside space that opens at the opening 81 formed between the pair of extending parts 84. Also, the retainer 8 is configured such that an arrangement direction of the pair of extending parts 84 across the center axis line CL crosses at a right angle with an arrangement direction of a pair of small diameter portions 59 across the center axis line CL.

Figure 10B:
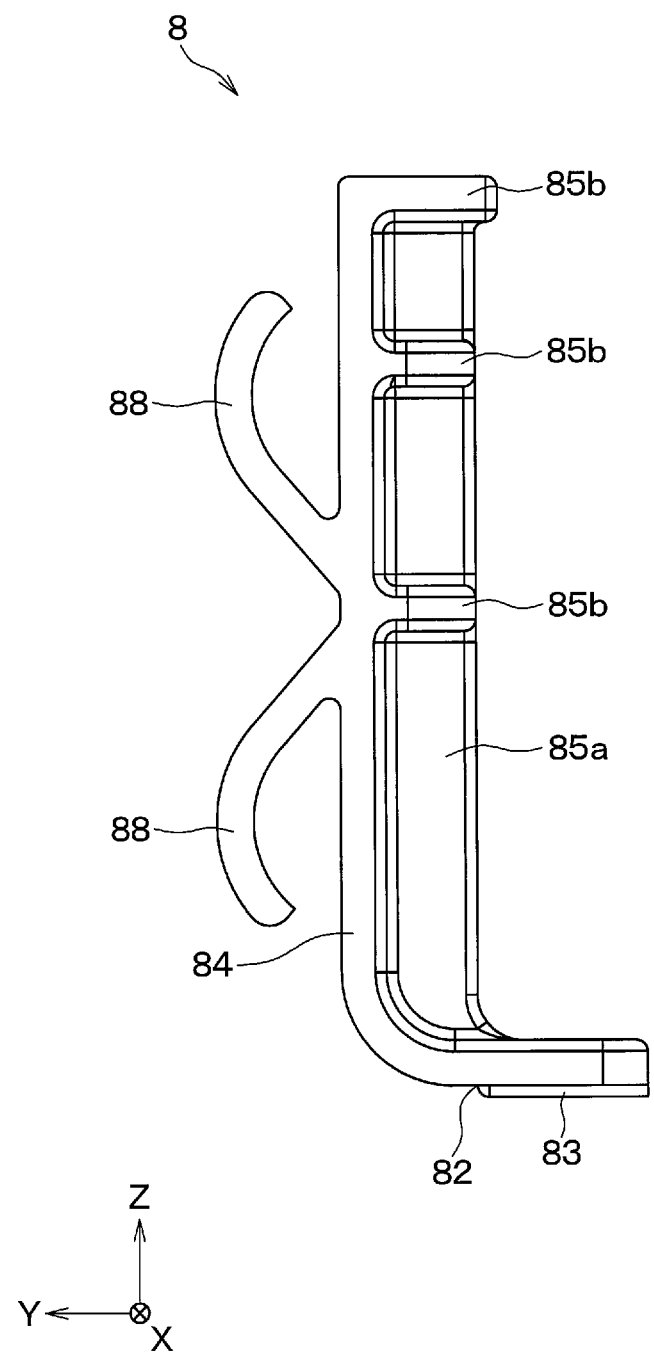
FIG. 10B is a right side view of the retainer shown in FIGS. 2A to 2D.

As shown in FIG. 10B, the retainer body 82 is formed in a substantially J-shape in a side view, with the coupling portion 83 and the pair of extending parts 84. That is, the coupling portion 83 is formed in a plate-like shape having a thickness direction in the Z-axis direction. The extending parts 84 are formed in a plate-like shape having a thickness direction in the axial direction.

The extending parts 84 are reinforced by a rib-shaped reinforcing part 85 which extend in the axial direction. Specifically, the reinforcing part 85 has a first rib 85a and a second rib 85b. The first rib 85a extends in the Z axis direction as an extending direction of the extending parts 84 at an intermediate position in the width direction of the extending parts 84, that is, the X axis direction in FIG. 10A. The second rib 85b extends from the first rib 85b towards outside in the width direction of the extending parts 84.

The extending parts 84 include a bezel contacting member 86. As shown in FIG. 10A, the bezel contacting member 86 is a portion positioned inside the first rib 85a in the width direction of the extending parts 84 and protrudes towards the above-described inside space that opens at the opening 81.

The bezel contacting member 86 has a bezel contacting surface 87. The bezel contacting surface 87 is a surface contacting with a retainer contact surface 75a of the bezel 7 when producing the mounted state. The bezel contacting surface 87 is formed in a smooth planar shape having the normal direction parallel to the center axis line CL in the mounted state.

Figure 10C:
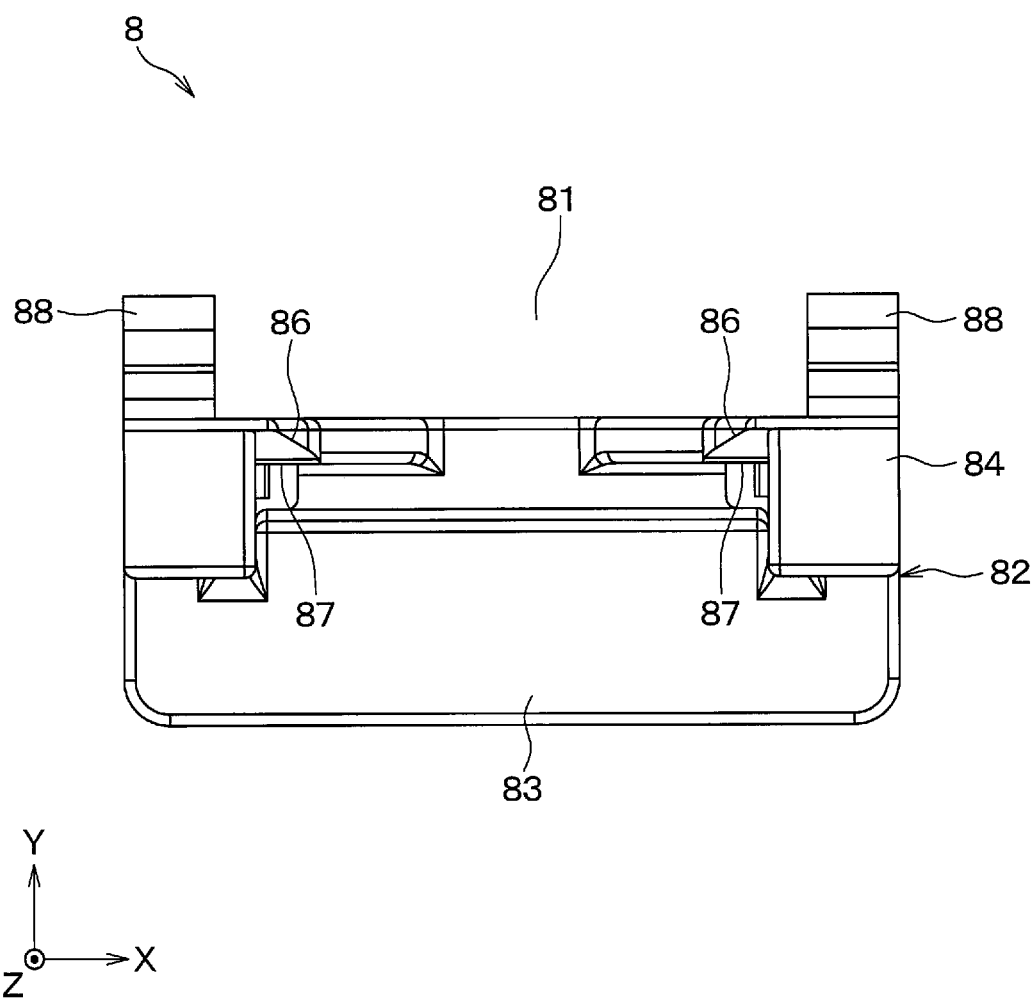
FIG. 10C is a plan view showing the retainer shown in FIGS. 2A to 2D.
Figure 10D:
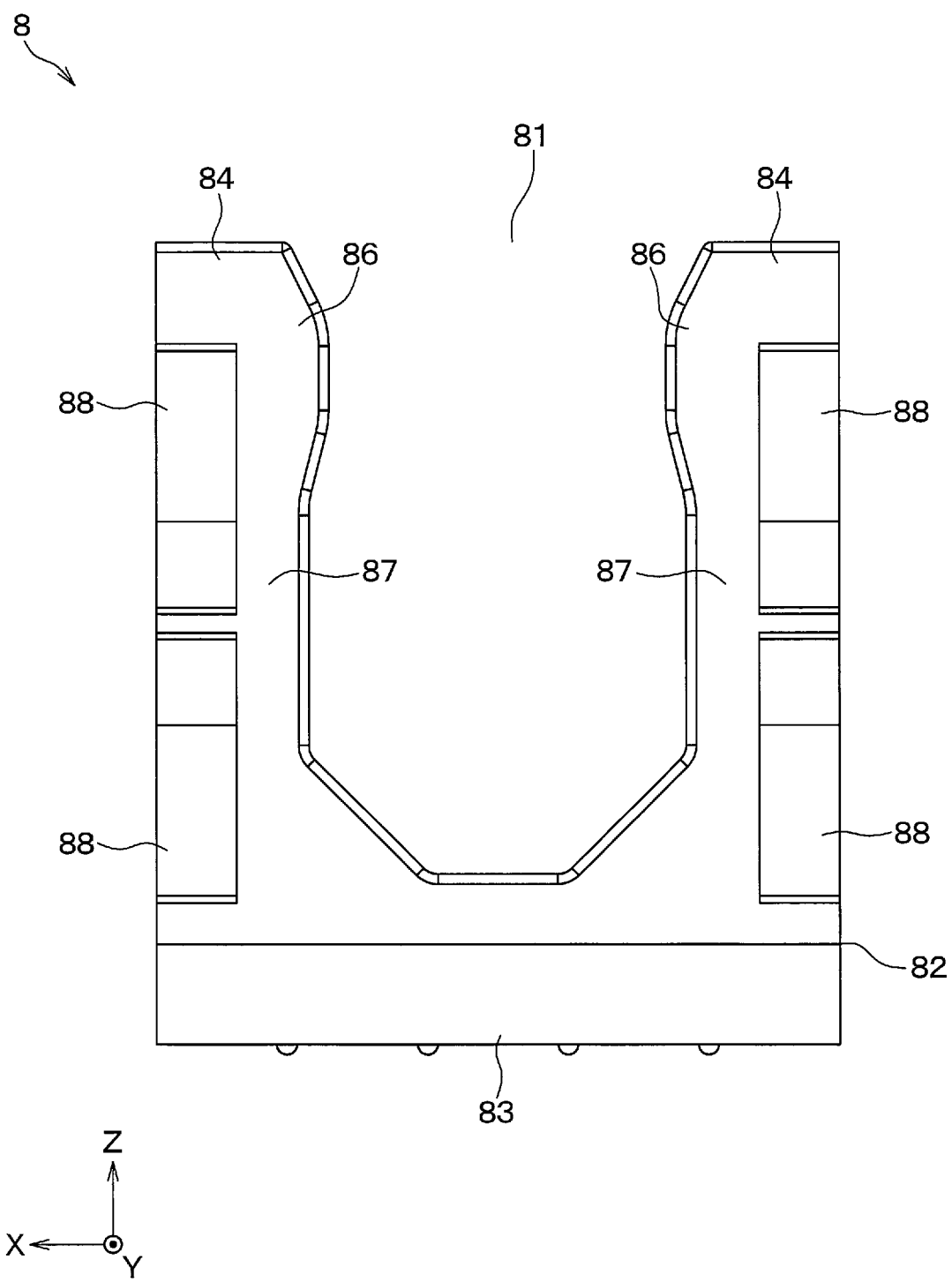
FIG. 10D is a front view of the retainer shown in FIGS. 2A to 2D.

As shown in FIGS. 10B to 10D, the retainer 8 includes an elastic part 88 as a cantilevered plate spring member which extends from the retainer body 82. The elastic part 88 extends in a direction inclined relative to the Y axis positive direction from substantially the center portion in the longitudinal direction of the extending parts 84. Specifically, according to the present embodiment, in respective pair of extending parts 84, a pair of elastic members 88 are provided in a gull-wing shape. The elastic member 88 is configured to be elastic deformed while contacting with the bumper back surface V32 in the mounted state where the retainer 8 is supported between the retainer contact surface 75a and the bumper back surface V32.

Effects and Advantages

Hereinafter, with reference to the respective drawings, a method for mounting the ultrasonic sensor 1 to the front bumper V3 and the mounted state thereof will be described together with the effects and advantages obtained from the configuration according to the present embodiment. Note that the following mounting method or the mounting process will be described using the right-handed XYZ rectangular coordinate system with respect to the on-vehicle state as shown in the drawings, in order to simplify the explanation. However, as described above, the ultrasonic sensor 1 can be detached or attached from to the front bumper V3 and the rear bumper V4 in a state where the front bumper V3 and the rear bumper V4 are detached from the vehicle body V1. Hence, the Z axis positive direction may be different from the upper direction in the actual mounting method or the mounting process.

Firstly, the sensor body 2 shown in FIGS. 3A, 3B, and 4 is produced. Also, the anti-vibration spacer 6 shown in FIG. 6A or the like is attached to the bezel 7 shown in FIG. 8A or the like. Then, the ultrasonic microphone 4 in the sensor body 2 and the cushion member 5 are inserted into the bezel 7 to which the anti-vibration spacer 6 is attached.

Then, the engagement hole 74a of the sensor engagement piece 74 in the cylindrical portion 72 and the bezel protruded lock portion 37 are engaged, whereby the bezel 7 is attached to the sensor body 2. Thus, the bezel 7 with the anti-vibration spacer 6 attached thereto is assembled to the sensor body 2, thereby producing the secondary assembly shown in FIG. 7. According to the secondary assembly, the cushion member 5 is accommodated in the cylindrical portion 72 of the bezel 7, surrounding the ultrasonic microphone 4.

The secondary assembly shown in FIG. 7 is inserted into the mounting hole V5 from the bumper outer space SG with the connector 32 as a top position. When the cylindrical portion 72 of the bezel 7 is inserted into the mounting hole V5, the inclined surface 76b of the temporal protrusion 76a contacts with an inner edge V51, whereby the free end of the temporal assembly piece 76 is elastically deformed in a direction approaching inward, that is, the center axis line CL. Then, when the temporal protrusion 76a passes through the mounting hole V5, the elastic deformation of the temporal assembly piece 76 is restored.

Then, with the flange portion 71 and the flange opposed surface 76c of the temporal protrusion 76a, the bezel 7 is supported by the front bumper V3, whereby the secondary assembly becomes in a state of temporary assembled state. Also, in the bumper inner space SN, the retainer 8 is in an attaching/detaching posture. In the attaching/detaching posture, the opening 81 opens towards the Z axis positive direction and the elastic member 88 faces the bumper back surface V32.

The bezel 7 of the secondary assembly in the temporal assembled state is inserted to the opening 81 in the attaching/detaching posture. Then, the extending parts 84 of the retainer 8 is inserted to the retainer insertion groove 75b provided in the bezel 7 of the secondary assembly while being slid in the Z axis positive direction.

When the retainer 8 is pressed in the Z axis positive direction such that the bezel 7 and the coupling portion 83 of the retainer 8 are at the closest position, the bezel contacting surface 87 stably contacts with the retainer contacting surface 75a. In this state, the retainer 8 is supported between the base end side projection 75 of the bezel 7 and the bumper back surface V32 with an elastic restoring force of the elastic member 88. Thus, the retainer 8 is attached to the secondary assembly in a temporal assembled state, whereby the mounted state or the on-vehicle state where the ultrasonic sensor 1 is mounted to the front bumper V3 are produced.

In the mounted state or the on-vehicle state, as shown in FIG. 9A and FIG. 9B, the cushion member 5, the anti-vibration spacer 6 and the bezel 7 are interposed between the ultrasonic microphone 4 and the front bumper V3. Specifically, the cushion member 5 is supported between the ultrasonic microphone 4 and the bezel 7. Further, the anti-vibration space 6 is supported between the flange portion 71 of the bezel 7 and the front bumper V3.

For a propagation of vibration between the ultrasonic microphone 4 and the front bumper V3 with the bezel 7 interposed therebetween, two propagation paths can be assumed. The first propagation path is a path between the flange portion 71 and the front bumper V3. For the first propagation path, with an interposition of the anti-vibration spacer 6 formed by a synthetic resin based elastic material, the propagation of vibration can be preferably suppressed.

On the other hand, the second propagation path is a path between the tip end side projection 77 as a tip end of the cylindrical portion in the axial direction and the front bumper V3. For the second propagation path, a vibration propagation suppressing member such as the anti-vibration spacer 6 is not provided. Specifically, in the case where the front bumper V3 is formed of a metallic plate member having high vibration propagation properties, there is a concern that an erroneous detection due to propagation of vibration may occur.

Further, in order to suppress unnecessary reception of ultrasonic waves reflected at the road surface, directional characteristics of the ultrasonic sensor 1 may be adjusted. In this case, a directional angle in the vertical direction is set to be smaller than the directional angle in the horizontal direction. In order to adjust the directional characteristics, as shown in FIG. 5, the diaphragm 43 is formed to have a longitudinal direction and a short side direction where the in-plane shapes cross at a right angle with each other. Specifically, the diaphragm 43 is formed to have an elliptic shape having a longitudinal direction along vertically upward and downward direction in the on-vehicle state.

Then, the side plate 44 in the microphone case 42 is configured to have a thin part 44b and a thick part 44c. The thin part 44b is provided at a position corresponding to both ends of the diaphragm 43 in the longitudinal direction. The thick part 44c is provided at a position corresponding to both ends of the diaphragm 43 in the short side direction. The longitudinal direction of the diaphragm 43 is a direction along the vertically upward and downward direction. The short side direction of the diaphragm 43 orthogonal to the longitudinal direction of the diaphragm 43 is a horizontal direction.

The thin part 44b has larger vibration than that of the thick part 44c. Hence, vibration may be propagated between a position corresponding to the thin part 44b, that is, a portion in the vicinity of the upper end and the lower end of the microphone case 42 in the on-vehicle state and the front bumper V3.

In this respect, according to the present embodiment, the cushion member 5 interposed between the ultrasonic microphone 4 and the bezel 7 has the following configuration. Specifically, the cushion member 5 includes a large diameter portion 58 and the small diameter portion 59. The large diameter portion 58 is supported between the ultrasonic microphone 4 and the bezel 7 while contacting with the ultrasonic microphone 4 and the bezel 7. The small diameter portion 59 is positioned adjacent to the larger diameter 58 in the circumferential direction, having an outer diameter smaller than that of the large diameter portion 58. That is, as shown in FIG. 9A and FIG. 9B, the small diameter portion 59 has a gap formed with the cylindrical portion 72 which is larger than that of the larger diameter portion 58.

A pair of large diameter portions 58 are arranged to face with each other across the center axis line CL. Similarly, a pair of small diameter portions 59 are arranged to face with each other across the center axis line CL. Also, one of the pair of large diameter portions 58, one of the pair of small diameter portions 59, the other one of the pair of large diameter members 58, and the other one of the small diameter portions 59 are adjacently arranged in this order in the circumferential direction. Further, the cushion member 5 is configured such that a direction where the pair of large diameter portions 58 positioned across the center line CL are arranged and a direction where the pair of small diameter portions 59 positioned across the center line CL are arranged, cross at a right angle with each other.

According to the present configuration, the small diameter portion 59 having a gap formed with the cylindrical portion 72 therebetween can be provided at both ends of the diaphragm 43 in the longitudinal direction, that is, a portion corresponding to the thin part 44b. Thus, propagation of vibration between the ultrasonic microphone 4 and the bezel 7 can preferably be suppressed. Hence, according to this configuration, propagation of the vibration can be suppressed as much as possible between the ultrasonic sensor 1 and the front bumper V3 as a vehicle component of an object to which the ultrasonic sensor 1 is mounted.

Further, according to the present configuration, the large diameter portion 58 contacting with the cylindrical portion 72 can be provided at both ends of the diaphragm 43 in the short side direction, that is, a portion corresponding to the thick part 44c having smaller vibration. Therefore, the assembled state of the secondary assembly can reliably be secured with the thick part 44c having smaller vibration, the larger diameter portion 58 and the cylindrical portion 72 which contact therebetween, and propagation of the vibration can preferably be suppressed with a gap between the small diameter portion 59 corresponding to the thin part 44b having larger vibration and the cylindrical portion 72.

Further, according to the present embodiment, the large diameter portion 58 is formed such that the length in the circumferential direction is shorter than that of the small diameter portion 59. Accordingly, the assembled state of the secondary assembly can reliably be secured and propagation of the vibration can be further suppressed between the ultrasonic microphone 4 and the bezel 7.

Further, according to the present embodiment, an arrangement direction of the pair of extending parts 84 that support the cylindrical portion 72 of the bezel 7 crosses at a right angle with an arrangement direction of the pair of small diameter portions 59 across the center axis line CL. In more detail, the direction where the secondary assembly is supported by the pair of extending parts 84 crosses at a right angle with the direction where thin parts 44b having large vibration are arranged across the center axis line CL. On the other hand, the direction where the secondary assembly is supported by the pair of extending parts 84 matches the direction where the thick parts 44c having less vibration are arranged across the center line CL.

Hence, the small diameter portions 59 are provided in a direction where the thin parts 44b having large vibration are arranged across the center axis line CL, whereby a gap is formed between the cushion member 5 and the bezel 7, and the bezel 7 is not supported by the pair of extending parts 84. Therefore, according to the present configuration, propagation of vibration between the ultrasonic microphone 4 and the bezel 7 can be further suppressed.

According to the present embodiment, for the first cylindrical portion 56 provided in the tip end side in the axial direction, the entire portion in the circumferential direction contacts with the ultrasonic microphone 4 and the bezel 7. That is, the small diameter portion 59 is not provided in the first cylindrical portion 56. On the other hand, the small diameter portion 59 is provided in the second cylindrical portion 57 positioned adjacent to the first cylindrical portion 56 in the base end side in the axial direction. Thus, erroneous detection due to water permeation into the tip end side of the ultrasonic sensor 1 in the axial direction can be avoided as much as possible.

Second Embodiment

Hereinafter, a second embodiment will be described with reference to FIG. 11. In the following explanation of the second embodiment, configurations different from the above-described first embodiment will mainly be described. In the first and second embodiment, the same reference symbols are applied to the same or equivalent portions. Hence, in the following second embodiment, for elements having the same reference symbols as those in the first embodiment, explanations for those in the first embodiment will be applied as long as no technical inconsistency or no additional explanation is applied. The same applies to a third embodiment and latter embodiments.

Figure 11:
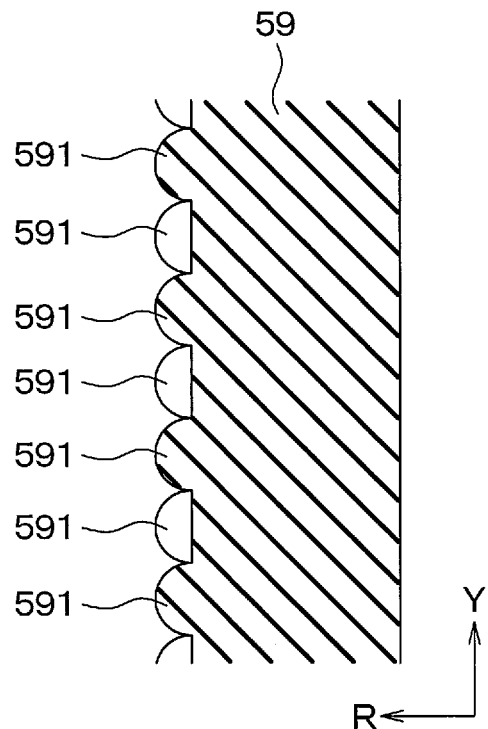
FIG. 11 is a cross-sectional view showing a cushion member according to a second embodiment in which a part of the cushion member is enlarged.

In FIG. 11, an arrow R indicates the radial direction. As shown in FIG. 11, according to the present embodiment, a plurality of protrusions 591 protruded in the radial direction are provided in the small diameter portion 59. Specifically, the protrusions 591 are formed in a substantially hemisphere shape, or a substantially conical shape in which the tip end thereof is rounded. The plurality of protrusions 591 are arranged in the axial direction and the circumferential direction. According to the present configuration, the assembled state of the secondary assembly can reliably be secured and propagation of the vibration can be further suppressed between the ultrasonic microphone 4 and the bezel 7.

Third Embodiment

Figure 12:
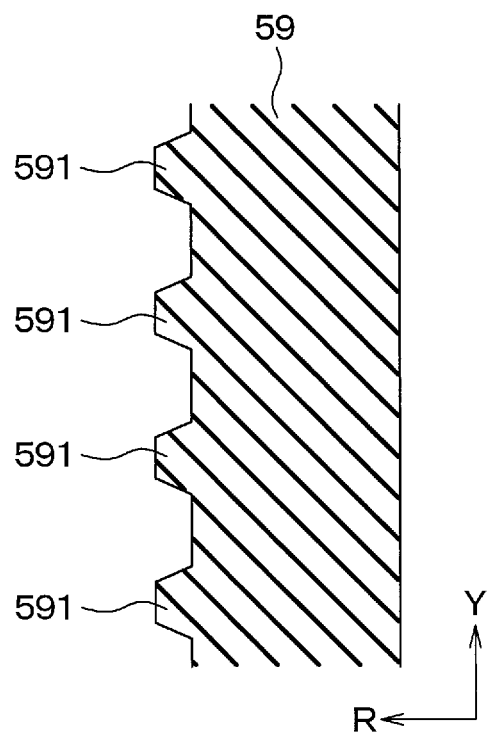
FIG. 12 is a cross-sectional view showing a cushion member according to a third embodiment in which a part of the cushion member is enlarged.

Hereinafter, with reference to FIG. 12, a third embodiment will be described. The present embodiment corresponds to an embodiment where a part of the above-described second embodiment is modified. In FIG. 12, the arrow R indicates a radial direction similar to that shown in FIG. 11.

According to the present embodiment, similar to the above-described second embodiment, in the small diameter portion 59, a plurality of protrusions 591 protruding in the radial direction are provided. However, according to the present embodiment, the protrusions 591 extend in the circumferential direction and have a rail shape, partial ring shape, or a screw thread shape. The plurality of protrusions are arranged in the axial direction area arranged in the axial direction. According to this configuration, effects and advantages similar to the above-described second embodiment will be obtained.

Fourth Embodiment

Figure 13:
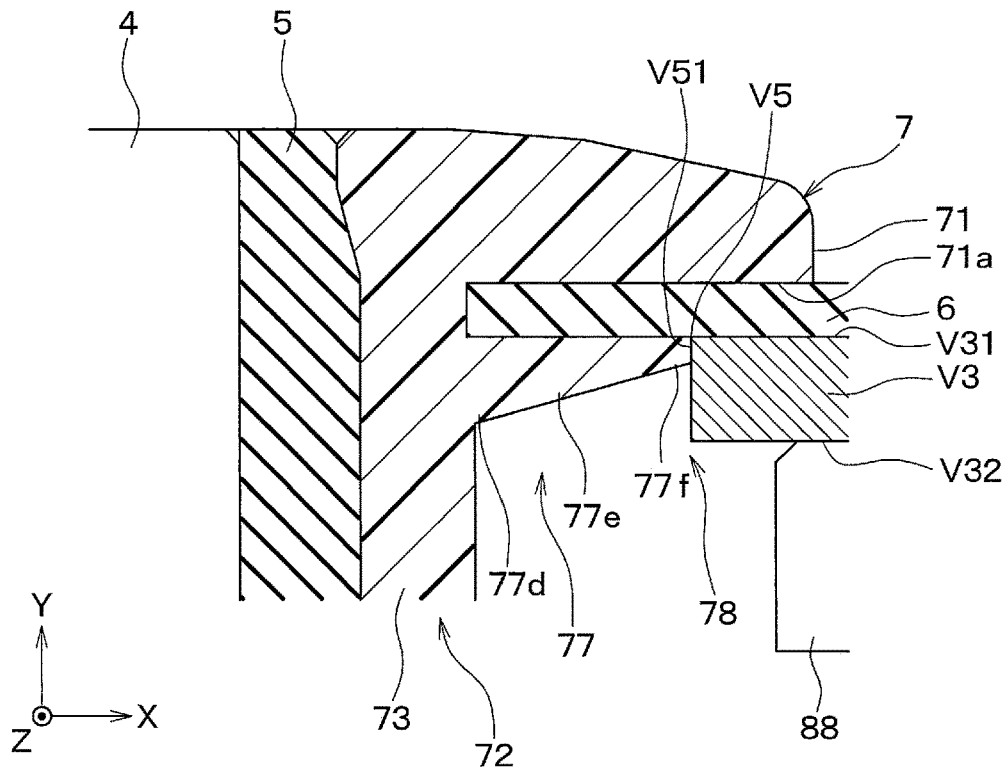
FIG. 13 is a cross-sectional view showing a part of the bezel and a portion in the vicinity of the bezel in a state of being mounted to the vehicle according to a fourth embodiment.

Hereinafter, with reference to FIG. 13, a fourth embodiment will be described. The present embodiment corresponds to an embodiment where a part of the above-described first embodiment illustrated in FIG. 9A is modified.

According to the present embodiment, the tip end side projection 77 as a through hole opposed portion 78 has an area reduced structure that reduces a contact area with the inner edge V51. Specifically, as shown in FIG. 13, the tip end side projection 77 has a tapered structure as the area reduced structure. The tip end side projection 77 is formed such that the smaller the axial dimension towards the radial direction, and the axial dimension becomes smaller than the thickness of the front bumper V3 at the end portion 77f. More specifically, the axial dimension of the tip end side projection 77 is formed to linearly decrease from the root portion 77d to the end portion 77f.

Further, the tip end side projection 77 is formed such that the axial dimension from the root portion 77d to the end portion 77f is smaller than the thickness of the front bumper V3. That is, the tapered structure provided in the tip end side protrusion 77 is formed such that the entire portion thereof is accommodated in the mounting hole V5 in the mounted state.

According to the present embodiment, a contact area between the tip end side projection 77 and the inner edge V51 of the mounting hole V5 is reduced, and propagation of the vibration in the second propagation path can preferably be suppressed. Hence, according to the present embodiment, vibration propagation between the ultrasonic sensor 1 and the front bumper V3 and an erroneous detection due to the vibration propagation can preferably be suppressed.

Fifth Embodiment

Hereinafter, with reference to FIG. 14, a fifth embodiment will be described. The present embodiment corresponds to an embodiment where a part of the above-described fourth embodiment is modified.

Figure 14:
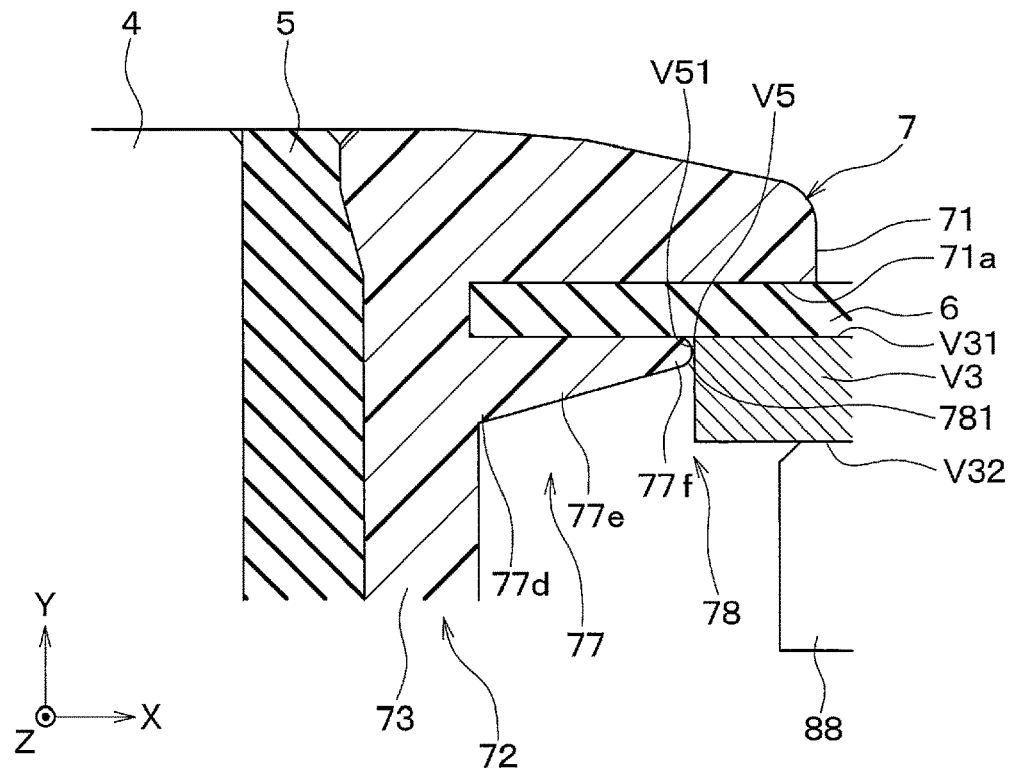
FIG. 14 is a cross-sectional view showing a part of the bezel and a portion in the vicinity of the bezel in a state of being mounted to the vehicle according to a fifth embodiment.

In the present embodiment, as shown in FIG. 14, the end portion 77f is formed in a curved shape protruding in the radial direction as a convex. Specifically, a tapered shape shown in FIG. 14 has a convex curved surface 781 at the tip end thereof in the radial direction.

According to this configuration, contact area between the tip end side projection 77 and the inner edge V51 of the mounting hole V5 is further reduced and propagation of the vibration in the second propagation path can preferably be suppressed. Hence, according to the present embodiment, vibration propagation between the ultrasonic sensor 1 and the front bumper V3 and an erroneous detection due to the vibration propagation can preferably be suppressed.

Modification Example

The present disclosure is not limited to the above-described embodiments. Therefore, the above-described embodiments may be appropriately modified. Hereinafter, typical modification examples will be described. In the following description of the modifications, configurations different from the above-described embodiments will be mainly described. Further, the same reference symbols are applied to the same or equivalent configurations in the above-described embodiments and modifications. Accordingly, in the following descriptions for the modifications, for elements having the same reference symbols as those in the above-described embodiments, explanations for those in the above-described embodiments will be applied as long as no technical inconsistency or no additional explanation is applied.

In the above-described embodiments, in order to simplify the explanation, the ultrasonic sensor 1 mounted to the front bumper V3 is described. However, the present disclosure is not limited to the specific aspect. Hence, a configuration in which the ultrasonic sensor 1 is mounted to the rear bumper V4 can readily be embodied considering the above-described embodiments.

An object to which the ultrasonic sensor 1 is attached is not limited to the front bumper V3 or the rear bumper V4. Specifically, for example, the ultrasonic sensor 1 can be mounted to the vehicle body panel V2. The mounting hole V5 can be provided in the vehicle body panel V2.

The ultrasonic sensor 1 is not limited to a configuration capable of transmitting and receiving ultrasonic waves. In other words, for example, the ultrasonic sensor 1 may be configured to only transmit ultrasonic waves. Alternatively, the ultrasonic sensor 1 may be configured to have only a function of receiving reflected waves of ultrasonic probing waves emitted from other ultrasonic transmitter, the reflected waves being reflected at objects existing around the own vehicle.

Further, configurations of respective parts in the ultrasonic sensor 1 are not limited to the above-described specific examples. Specifically, materials that constitute the respective parts may be appropriately modified from the above-described specific examples. Moreover, a plurality of elements formed of the same material may be formed of different materials. Similarly, a plurality of elements formed of different materials may be formed of the same material.

The plurality of elements integrally formed without any joints may be formed of separated members attached to each other. Similarly, a plurality of elements formed of separated members attached to each other may be integrally formed without any joints.

The specific configuration of the sensor case 3 is not limited to the above-described specific examples. That is, for example, the structure of the connector 32 and the extending direction thereof may be appropriately modified. Further, the shape of the microphone supporting part 33 is not limited to the substantially cylindrical shape, but may be formed in a substantially elliptic cylindrical shape or a substantially polygonal cylindrical shape and the like.

The outline of the ultrasonic microphone 4, that is, the outline shape of the microphone case 42 is not limited to the substantially cylindrical shape, but may be formed in a substantially elliptic columnar shape, a substantially polygonal columnar shape and the like. An electromechanical transducer that constitutes the ultrasonic element 41 is not limited to the piezoelectric element.

The specific configuration of the cushion member 5 is not limited to the above-described examples. For example, the shape of the cushion member 5 is not limited to the substantially cylindrical shape, but may be formed in a substantially elliptic cylindrical shape, a substantially polygonal cylindrical shape and the like.

Similar to the bezel 7, the cushion member 5 may constitute the secondary assembly which is assembled from the sensor body as the primary assembly. In this case, for example, the ultrasonic microphone 4 is supported by the microphone supporting part 33 of the sensor case 3 without the cushion member 5. Also, the cushion member 5 is formed in a cylindrical shape having an axial dimension which is substantially the same as the axial dimension of the ultrasonic microphone 4, that is, microphone case 42.

The large diameter portion 58 and the cylindrical portion 72 may face with each other with a gap therebetween. In other words, the large diameter portion 58 and the cylindrical portion 72 may not contact with each other in the entire periphery or a part of the periphery.

The second cylindrical portion 57 having the small diameter portion 59 may be provided at least at a portion corresponding to the tip end side projection 77. Thus, propagation of the vibration in the above-described second propagation path can preferably be suppressed.

A large diameter portion 58 may be provided at least a part of portion in the circumferential direction of the first cylindrical portion 56, and a small diameter portion 59 may be provided in the entire portion in the circumferential direction of the second cylindrical portion 57. In this case, the vibration absorber (5) has a large diameter portion (58) and a small diameter portion (59). The larger diameter portion is provided to be supported between the ultrasonic microphone (4) and the sensor mounting device (7) while contacting with the ultrasonic microphone and the sensor mounting device. The small diameter portion is provided being positioned adjacent to the large diameter portion in the further base end side than the larger diameter portion is in the axial direction. The small diameter portion is provided over the entire portion of vibration absorber in the circumferential direction.

The specific configurations of the bezel 7 and the retainer 8 for mounting the ultrasonic sensor 1 to the plate-shaped vehicle components (e.g. front bumper V3), are not limited to the above-described specific example. For example, detailed configuration of the bezel 7 and/or the retainer 8 may be appropriately changed from the above-described specific example.

A fixing means or a fixing part for fixing the bezel 7 to the vehicle component may be provided at the bezel 7 itself, whereby the retainer 8 can be omitted.

A convex-concave relationship between the bezel side engagement portion 77a and the bumper side engaging member V52 can be reversely set. That is, the bezel side engagement portion 77a can be provided as a convex portion having larger amount of protrusion in the radial direction of the tip end side projection 77 than that of other portions. In this case, the bumper side engaging member V52 may be provided as a portion in which the hole diameter of the mounting hole V5.

The above-described area reduced structure is not limited to the tapered structure in the tip end side projection 77. For example, a plurality of protrusions protruded in the radial direction may be provided on a surface, as the through hole opposed portion 78, which closely faces the inner edge V51 of the end portion 77f of the tip end side projection 77 in the radial direction. Thus, the contact area between tip end side projection 77 and the inner edge V51 of the mounting hole V5 is reduced, whereby propagation of the vibration in the second propagation path can preferably be suppressed.

The above-described area reduced structure may be provided entirely on the tip end side projection 77 in the circumferential direction. Alternatively, the above-described area reduced structure may be provided in at least a portion corresponding to both ends of the diaphragm 43 in the longitudinal direction.

For the elements constituting the above-described embodiments, they are not necessarily required except where elements are clearly specified as necessary or theoretically necessary. Even in the case where numeric values are mentioned in the above-described embodiments, such as the number of constituents, quantity, range or the like, it is not limited to the specific values unless it is specified as necessary or theoretically limited to specific numbers. Similarly, in the case where shapes, directions and positional relationships and the like are mentioned for the constituents in the above-described embodiments, it is not limited to the shapes, directions and positional relationships except that they are clearly specified or theoretically limited to specific material, shapes, positional relationships and the like.

Further, the modification examples are not limited to the above-described examples. For example, except the above-exemplified embodiments, a plurality of embodiments may be mutually combined as long as no technical discrepancy is present. Moreover, a plurality of modification examples may be mutually combined as long as no technical discrepancy is present.

CONCLUSION

The present disclosure provides an ultrasonic sensor capable of suppressing propagation of vibration between the ultrasonic sensor and a vehicle component as an object to which the ultrasonic sensor is attached, and a vibration absorber provided on the ultrasonic sensor.

A vibration absorber is a component used for mounting an ultrasonic sensor having a column shaped ultrasonic microphone extending in an axial direction parallel to a center axis line to a plate-shaped vehicle component. The vibration absorber is provided in the ultrasonic sensor being interposed between a sensor mounting device and the ultrasonic microphone, the sensor mounting device being provided surrounding a side surface of the ultrasonic microphone in an on-vehicle state where the ultrasonic sensor is mounted to the plate-shaped vehicle component.

According to a first aspect of the present disclosure, the vibration absorber includes a large diameter portion provided to be supported between the ultrasonic microphone and the sensor mounting device while contacting with the ultrasonic microphone and the sensor mounting device; and a small diameter portion provided adjacent to the large diameter portion in a circumferential direction that surrounds the center axis line, and formed such that an outer diameter with respect to the center axis line as a center is smaller than that of the large diameter portion, in which a pair of large diameter portions are disposed to face with each other across the center axis line; a pair of small diameter portions are disposed to face with each other across the center axis line; and a direction where the pair of large diameter portions positioned across the center axis line are arranged and a direction where the pair of small diameter portions positioned across the center axis line are arranged, cross each other at a right angle.

According to another aspect of the present disclosure, an ultrasonic sensor includes the vibration absorber, the sensor mounting device and an anti-vibration spacer. The sensor mounting device includes a cylindrical portion and a flange portion. The cylindrical portion is provided to be accommodated in a through hole formed in the plate-shaped vehicle component in the on-vehicle state while surrounding the ultrasonic microphone. The flange portion is provided at one end of the cylindrical portion in the axial direction, protruding from the center axis line in the radial direction which radially extends. The flange portion is formed having an outer diameter larger than that of the through hole to face a portion around the through hole in an outer surface of the plate-shaped vehicle component in the on-vehicle state. The anti-vibration spacer is formed of synthetic resin based elastic material, interposed between the sensor mounting device and the plate-shaped vehicle component. Specifically, the anti-vibration spacer is provided to be supported between the flange portion and the plate-shaped vehicle component.

What is claimed is:

1. A vibration absorber, as a component used for mounting an ultrasonic sensor having a column shaped ultrasonic microphone extending in an axial direction parallel to a center axis line to a plate-shaped vehicle component, provided in the ultrasonic sensor being interposed between a sensor mounting device and the ultrasonic microphone, the sensor mounting device being provided surrounding a side surface of the ultrasonic microphone in an on-vehicle state where the ultrasonic sensor is mounted to the plate-shaped vehicle component, the vibration absorber comprising:

a large diameter portion provided to be supported between the ultrasonic microphone and the sensor mounting device while contacting the ultrasonic microphone and the sensor mounting device; and a small diameter portion provided adjacently to the large diameter portion in a circumferential direction that surrounds the center axis line, and formed such that an outer diameter with respect to the center axis line as a center is smaller than that of the large diameter portion, wherein a pair of large diameter portions are disposed to face each other across the center axis line;

a pair of small diameter portions are disposed to face each other across the center axis line; and a direction where the pair of large diameter portions positioned across the center axis line are arranged and a direction where the pair of small diameter portions positioned across the center axis line are arranged, cross each other at a right angle.

2. The vibration absorber according to claim 1, wherein one of the pair of large diameter portions, one of the pair of small diameter portions, the other one of the pair of large diameter members, and the other one of the small diameter portions are adjacently arranged in this order in the circumferential direction.

3. The vibration absorber according to claim 2, wherein a length in the circumferential direction of the large diameter portion is formed to be shorter than that of the small diameter portion.

4. The vibration absorber according to claim 1, wherein a first cylindrical portion is provided in a tip end side in the axial direction to be supported between the ultrasonic microphone and the sensor mounting device while contacting with the ultrasonic microphone and the sensor mounting device;

a second cylindrical portion is provided to be positioned adjacently to the first cylindrical portion at a base end side in the axial direction; and the small diameter portion is provided in the second cylindrical portion.

5. The vibration absorber according to claim 1, wherein the ultrasonic microphone has a diaphragm having a thickness direction in the axial direction;

the diaphragm has a longitudinal direction and a short side direction where shapes in a plane orthogonal to the center axis line cross at a right angle with each other; and the small diameter portion is provided at a portion corresponding to both ends of the diaphragm in the longitudinal direction.

6. The vibration absorber according to claim 1, wherein a plurality of protrusions protruded from the center axis line in a radial direction are provided in the small diameter portion.

7. The vibration absorber according to claim 1, wherein the plate-shaped vehicle component is made of metal.

8. The vibration absorber according to claim 1, wherein the sensor mounting device includes a cylindrical portion to be accommodated in a through hole formed in the plate-shaped vehicle component in the on-vehicle state while surrounding the ultrasonic microphone; and the small diameter portion is formed such that a gap formed with the cylindrical portion is larger than that of the large diameter portion.

9. An ultrasonic sensor comprising:

a vibration absorber, as a component used for mounting an ultrasonic sensor having a column shaped ultrasonic microphone extending in an axial direction parallel to a center axis line to a plate-shaped vehicle component, provided in the ultrasonic sensor being interposed between a mounting device and the ultrasonic microphone, the mounting device being provided surrounding a side surface of the ultrasonic microphone in an on-vehicle state where the ultrasonic sensor is mounted to the plate-shaped vehicle component, the vibration absorber comprising:

a large diameter portion provided to be supported between the ultrasonic microphone and the mounting device while contacting with the ultrasonic microphone and the mounting device; and a small diameter portion provided adjacently to the large diameter portion in a circumferential direction that surrounds the center axis line, and formed such that an outer diameter with respect to the center axis line as a center is smaller than that of the large diameter portion, wherein a pair of large diameter portions are disposed to face with each other across the center axis line;

a pair of small diameter portions are disposed to face with each other across the center axis line; and a direction where the pair of large diameter portions positioned across the center axis line are arranged and a direction where the pair of small diameter portions positioned across the center axis line are arranged, cross each other at a right angle, a sensor mounting device as the mounting device; and an anti-vibration spacer formed of synthetic resin based elastic material, interposed between the sensor mounting device and the plate-shaped vehicle component, wherein the sensor mounting device has a flange portion at one end of a cylindrical portion in the axial direction, protruding from the center axis line in a radial direction which radially extends;

the flange portion is formed having an outer diameter larger than that of a through hole to face a portion around the through hole in an outer surface of the plate-shaped vehicle component in the on-vehicle state;

the anti-vibration spacer is provided to be supported between the flange portion and the plate-shaped vehicle component.

10. The ultrasonic sensor according to claim 9 further comprising a sensor fixing tool supported between the cylindrical portion and the plate-shaped vehicle component in the on-vehicle state by inserting the cylindrical portion to a portion between the cylindrical portion and the plate-shaped vehicle component in a state where the cylindrical portion is inserted into the through hole;

wherein the sensor fixing tool is formed in a U-shape with a pair of extending parts disposed to face with each other across the center axis line while extending in a direction crossing the center axis line, and a coupling portion provided to mutually couple one ends in the pair of extending parts;

the cylindrical portion is supported between the pair of extending parts;

the direction where the pair of small diameter portions positioned across the center axis line are arranged and the direction where the pair of extending parts positioned across the center line are arranged, cross each other at a right angle.

11. The ultrasonic sensor according to claim 9, wherein a through hole opposed portion is provided in the cylindrical portion to be capable of contacting with an inner edge of the through hole in the on-vehicle state;

the through hole opposed portion has an area reduced structure that reduces a contact area which contacts with the inner edge.

12. The ultrasonic sensor according to claim 9, wherein the cylindrical portion includes a cylindrical shaped body extending in the center axis line and a projection as a through hole opposed portion projected in the radial direction while being integrally coupled with the body;

the projection extends in the circumferential direction;

an area reduced structure is a tapered structure in which an axial dimension of the projection becomes smaller towards the radial direction and becomes smaller than a thickness of the plate-shaped vehicle component at an end portion of the projection in the radial direction.

13. The ultrasonic sensor according to claim 11, wherein the cylindrical portion includes a cylindrical shaped body extending in the center axis line and a projection as the through hole opposed portion projected in the radial direction while being integrally coupled with the body;

the projection extends in the circumferential direction;

the area reduced structure is a tapered structure in which an axial dimension of the projection becomes smaller towards the radial direction and becomes smaller than a thickness of the plate-shaped vehicle component at an end portion of the projection in the radial direction.

* * * * *